United States Patent
Kawabe et al.

(10) Patent No.: US 7,983,794 B2
(45) Date of Patent: Jul. 19, 2011

(54) INTERFACE APPARATUS AND MOBILE ROBOT EQUIPPED WITH THE INTERFACE APPARATUS

(75) Inventors: Koji Kawabe, Saitama (JP); Satoki Matsumoto, Saitama (JP); Sachie Hashimoto, Saitama (JP); Taro Yokoyama, Saitama (JP); Yoko Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1258 days.

(21) Appl. No.: 11/635,041

(22) Filed: Dec. 7, 2006

(65) Prior Publication Data

US 2007/0135962 A1 Jun. 14, 2007

(30) Foreign Application Priority Data

Dec. 12, 2005 (JP) ................................. 2005-358338

(51) Int. Cl.
*G05B 19/00* (2006.01)
(52) U.S. Cl. ........ 700/264; 700/225; 700/245; 700/258; 901/1
(58) Field of Classification Search ............... 340/572.1, 340/572.4; 700/245, 246, 258, 259, 264; 901/1
See application file for complete search history.

(56) References Cited

U.S. PATENT DOCUMENTS

| | | | | |
|---|---|---|---|---|
| 5,204,670 A * | 4/1993 | Stinton | ........................ | 340/10.5 |
| 5,640,002 A * | 6/1997 | Ruppert et al. | .......... | 235/462.46 |
| 5,721,421 A * | 2/1998 | VanDonkelaar | ......... | 235/462.15 |
| 6,401,846 B1 | 6/2002 | Takenaka et al. | | |
| 6,433,687 B1 * | 8/2002 | Yamaashi et al. | .......... | 340/573.1 |
| 6,703,935 B1 * | 3/2004 | Chung et al. | ................ | 340/572.7 |
| 6,960,986 B2 * | 11/2005 | Asama et al. | ............... | 340/10.41 |
| 7,266,770 B2 * | 9/2007 | Onbe et al. | ..................... | 715/702 |
| 7,298,270 B2 * | 11/2007 | Ishiguro et al. | ............ | 340/572.1 |
| 7,317,388 B2 * | 1/2008 | Kawabe et al. | ........... | 340/539.13 |
| 2001/0020837 A1 * | 9/2001 | Yamashita et al. | ............. | 318/567 |
| 2004/0093219 A1 * | 5/2004 | Shin et al. | ...................... | 704/275 |
| 2005/0054332 A1 * | 3/2005 | Sakagami et al. | .......... | 455/414.1 |
| 2005/0159841 A1 * | 7/2005 | Yasukawa et al. | ............ | 700/245 |
| 2005/0218292 A1 | 10/2005 | Kawabe et al. | | |
| 2007/0081529 A1 * | 4/2007 | Sugiyama et al. | ............ | 370/382 |
| 2008/0263164 A1 * | 10/2008 | Portele et al. | ................. | 709/206 |

FOREIGN PATENT DOCUMENTS

JP 2001-209644 A 8/2001
JP 2005-321845 A 11/2005

OTHER PUBLICATIONS

Yoshimi, Takashi, et al., "Development of a Concept Model of a Robotic Information Home Appliance, ApriAlpha", Intelligent Robots and Systems, Sep. 28-Oct. 2, 2004, pp. 205-211.
Stiefelhagen, R. et al., "Natural Human-Robot Interaction Using Speech, Head Pose and Gestures", Intelligent Robots and Systems, Sep. 28-Oct. 2, 2004, pp. 2422-2427.
Hashimoto, S. et al., "Humanoid Robots in Waseda University—Hadaly-2 and WABIAN", XP-002421754, Jan. 2002, pp. 25-38.
European Search Report application No. 06256313.5-2225 dated Mar. 7, 2007.

* cited by examiner

*Primary Examiner* — Khoi Tran
*Assistant Examiner* — Jerrah Edwards
(74) *Attorney, Agent, or Firm* — Squire, Sanders & Dempsey (US) LLP

(57) ABSTRACT

A robot recording a message on a wireless tag which includes: a voice recognition unit recognizing a voice input by a voice input unit which inputs a voice of a person; a message extraction unit extracting the message from the voice recognized by the voice recognition unit based on a fixed phrase provided for obtaining a message; a recording unit recording the message extracted by the message extraction unit on the wireless tag provided on an object.

5 Claims, 11 Drawing Sheets

FIG.6
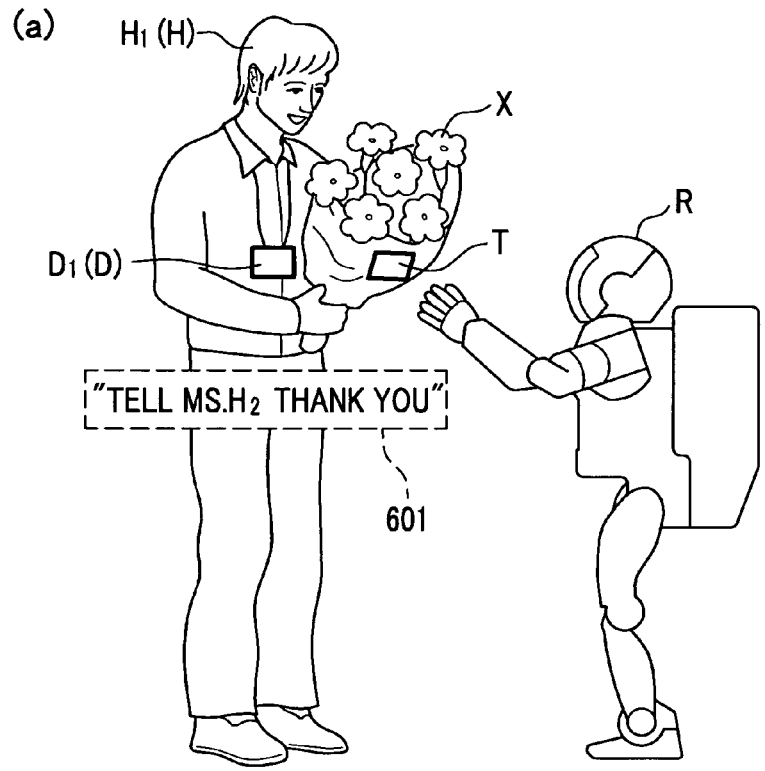
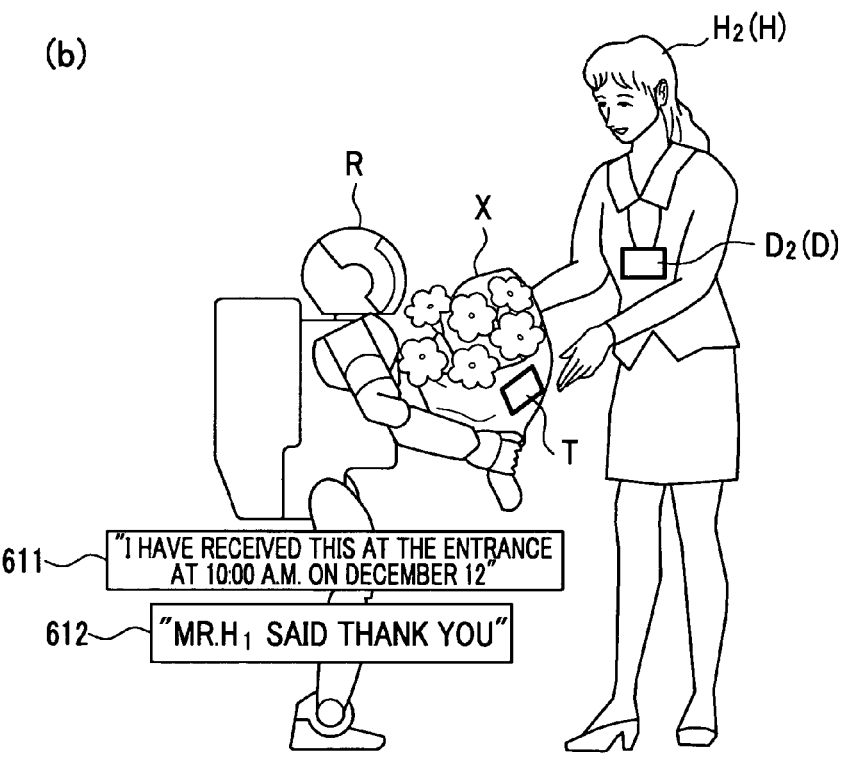

INTERFACE APPARATUS AND MOBILE ROBOT EQUIPPED WITH THE INTERFACE APPARATUS

BACKGROUND OF THE INVENTION

1. Field of the Invention

The present invention relates to an interface apparatus constituting an interface through which human and a wireless tag attached to an object are connected. Also, the present invention relates to a mobile robot equipped with the interface apparatus.

2. Description of Relevant Art

Conventionally, a robot equipped with a voice recognition unit and a voice synthesis unit for having a conversation with person has been discovered for example in U.S. unexamined patent publication No. 2005/0218292A1.

The robot disclosed in U.S. unexamined patent publication No. 2005/0218292A1 performs a series of motion (tasks), by which the robot receives an object from a person (client) who has requested a conveyance of the object, moves to a certain place, and hands the object to a recipient. Here, this robot has a conversation controller for having a conversation with a client and recipient.

However, the robot of No. 2005/0218292A1 can only output a simple voice message, such as "I have a delivery for you", to a recipient. Thus, the conversation between the recipient and the mobile robot is poor in content and it is hard for the recipient to feel warmth with the robot. Additionally, the client sometimes has a desire to transfer a message to the recipient through the robot.

In order to fulfill such desire, there is a method comprising the steps of: recording a message of a client on a wireless tag provided on an object; making a robot carry the object with the wireless tag; and making the robot utter the message, which is obtained from the wireless tag while the robot is made to pass the object to the recipient.

In this case, however, in order to record predetermined information on the wireless tag, the user (operator) who uses a terminal has to input predetermined data through the terminal to provide data ready for recording on the wireless tag. Thus, the provision of such data requires time and effort.

Therefore, an interface apparatus which can automatically record predetermined information on the wireless tag and can resolve such defects has been desired. Also, a mobile robot equipped with this interface apparatus has been desired.

SUMMARY OF THE INVENTION

The present invention relates to an interface apparatus for recording a message on a wireless tag. This interface apparatus includes: a voice recognition unit for recognizing a voice input by a voice input unit which inputs a voice of a person; a message extraction unit for extracting the message from the voice recognized by the voice recognition unit; and a recording unit for recording the message extracted by the message extraction unit on an object tag, which is a wireless tag for an object and is provided on the object.

According to this apparatus, the interface apparatus recognizes a voice of a person by converting voice data output from the voice input unit into text data, using the voice recognition unit. Then, the interface apparatus extracts message from the voice recognized by the voice recognition unit, using the message extraction unit.

Here, a message from a client who ordered a conveyance to a recipient and a self message from a client who ordered a conveyance to himself are examples of the message extracted by the message extraction unit. Here, the message extraction unit may extract a message based on a fixed phrase which is provided beforehand for extracting a message.

Then, the interface apparatus records the message extracted by the voice message extraction unit, using the recording unit. Here, the recording unit can perform a recording of the message at a suitable timing when the message is extracted.

Here, it is preferable that the interface apparatus includes: an image processing unit for extracting image information of a person from an acquired image which is obtained by an image pickup of the person by an image pickup unit; and an image message extraction unit for extracting the message associated with unique image information, based on unique image information and image information extracted by the image processing unit. In this case, it is preferable that the unique image information is a gesture or sign language associated with the message, and that the recording unit records the message extracted by the image message extraction unit on the object tag.

According to this apparatus, the interface apparatus extracts image information of a person from an acquired image which is obtained by an image pickup of the person by the image pickup unit, using the image processing unit. Here, the image processing unit extracts image information of a moving person.

Then, the interface apparatus extracts the message based on unique image information, which is a gesture or sign language associated with the message, and image information, which is extracted by the image processing unit, using the image message extraction unit.

Here, unique image information is image information of a person that is obtained beforehand by an image pickup device, e.g. camera, and unique image information is associated with the message and is stored in a recording unit.

Also, a pattern matching, a statistical technique, and a method using a neural network can be used as a method for extracting the message. The comparison between feature parameters of information of an image can be adoptable as this method.

Then, the interface apparatus records the message extracted by the image message extraction unit on the object tag.

Additionally, it is preferable that the interface apparatus further includes a time clock for obtaining a time, and the recording unit records the time obtained by the time clock together with the message on the object tag.

According to this apparatus, the interface apparatus records the time obtained by the time clock together with the message on the object tag, using the recording unit. Therefore, the time of when the message was recorded can be obtained, when performing a readout of the message recorded on the object tag.

Additionally, it is preferable that the interface apparatus further includes: a reading unit for obtaining information from the object tag or a person tag which is a wireless tag for a person and stores personal information of the person; and a voice synthesizer for synthesizing voice information which is associated with the information recorded on the object tag or the person tag as an output voice, based on information obtained by the reading unit.

According to this interface apparatus, information is obtained from the object tag or the person tag, using the reading unit, and voice is synthesized based on the obtained information using the voice synthesizer. Thereby, the message to be uttered an utterance can be synthesized based on information recorded on the object tag.

Furthermore, in the interface apparatus, it is preferable that the recording unit records personal information, which is obtained from the person tag by the reading unit, on the object tag together with the message.

According to the interface apparatus, the interface apparatus records personal information, which is obtained from the person tag by the reading unit, on the object tag together with the message using the recording unit.

Here, the person tag is a tag provided on a person, who requests a transfer of a message, and holds therein personal information of the person. An identification number (ID) to identify a client, name, age, and location (address) etc. are examples of personal information. Thereby, personal information of a client who requests a conveyance of a message can be obtained, when performing a readout of the message recorded on the object tag.

The present invention relates to a mobile robot which includes: an interface apparatus having above described configurations; a current position information acquisition unit for acquiring position information which indicates a current position of the mobile robot; a locomotion unit for traveling the robot to a destination; and an autonomous travel controller for actuating the locomotion unit based on a command which indicates the destination and map information indicating a map within a predetermined moving range.

According to this mobile robot, the mobile robot moves autonomously without remote control, by determining a destination. Here, since the mobile robot has the interface apparatus, the writing of the message, which is extracted from a voice or image, at the destination on the object tag can be performed.

In the above described mobile robot, it is preferable that the recording unit of the interface apparatus records the position information, which is acquired by the current position information acquisition unit, on the object tag together with the message.

According to the mobile robot, the robot can record position information, which is acquired by the current position information acquisition unit, on the object tag together with the message. Here, a latitude and longitude, a name of place on a map, identification information etc. on a predetermined route are examples of the position information. Thereby, the position where the message was record can be obtained, when performing a readout of the message recorded on the object tag.

Furthermore, it is preferable that the above described robot further includes: an operation determination unit for determining an operation to be performed by the mobile robot from among operations at least including a delivery of the object and a utterance of a predetermined voice in accordance with an input of a predetermined command, and the motion determination unit determines the operation based on at least one of personal information, which is obtained from the person tag by the reading unit of the interface apparatus, and information written by the recording unit.

According to this configuration, the mobile robot can determine the operation to be performed by the mobile robot from among operations at least including a delivery of the object and an utterance of a predetermined voice in accordance with an input of a predetermined command, using the operation determination unit.

Here, a message from a client, a time and a place of the request are examples of the information to be recorded by the recording unit. Thereby, various kinds of operations can be performed by the mobile robot by providing the different operations depending on the types of message from a person or on a difference of a tag (person).

In the mobile robot, it is preferable that the autonomous travel controller actuates the locomotion unit to move the robot to the destination where the operation determined by the motion determination unit is performed.

According to the above described configuration, the mobile robot can perform an operation determined by the autonomous travel controller. That is, the mobile robot can move to the location where a pass of the object and an utterance are performed.

According to the present invention, by only inputting a voice of a person, the message extracted from an inputted voice can be automatically recorded on the wireless tag. Thereby, an operator for inputting a message is not required, a time and effort which are required for inputting a message on the wireless tag can be cut.

According to the present invention, a message is extracted from an input image when a person makes a gesture or sign language in front of the image pickup device. Thus, the recording of the message on the object tag can be achieved automatically, by simply providing gestures etc.

According to the present invention, since the readout of the time can be performed when performing a readout of the message which is recorded on the object tag, the recipient of the object can recognize the time of when the message was recorded.

According to the present invention, since other interface can obtain the message from the object tag, in which a message is recorded, the other interface can synthesize a voice message based on the obtained information. Thus, the versatility of the interface apparatus is improved.

According to the present invention, since personal information of the client who requested the message conveyance can be obtained when performing a readout of the message recorded on the object tag, the recipient of the object provided with the object tag can recognize the person who requested the message conveyance.

According to the present invention, since the recording of the message extracted from the voice and image can be performed at the instructed destination by instructing the destination of the mobile robot, the versatility of the robot can be improved. Additionally, the object can be delivered to the destination via a plurality of robots, bypassing the object from one robot to another robot.

According to the present invention, the information, which indicates the position where the message was recorded, can be obtained, when performing the readout of the message recorded on the object tag. Thus, the recipient of the object provided with the object tag can recognize where the object came from.

According to the present invention, since various kinds of operations can be performed by the mobile robot by providing the different operations depending on the types of message from a person or on a difference of a tag, the person who communicates with the mobile robot can have a feeling of affinity to a robot.

According to the present invention, the robot can move to the position where the operation, which is defined depending on the types of message from a person or on a difference of a tag, is performed.

BRIEF DESCRIPTION OF THE DRAWINGS

FIG. 6A is an explanatory view of the conveyance of the object by the robot shown in FIG. 1 wherein the receipt of the object is shown.

FIG. 6B is an explanatory view of the conveyance of the object by the robot shown in FIG. 1 wherein the transfer of the object is shown.

DETAILED DESCRIPTION OF THE PREFERRED EMBODIMENT

An interface apparatus of the present invention and a mobile robot equipped with this interface apparatus will be explained with reference to attached drawings. In the following explanation, the mobile robot will be simply indicated as "robot".

Firstly, an overall configuration of a message recording system A including a mobile robot of the present invention will be explained with reference to FIG. 1.

(Configuration of Message Recording System A)

Figure 1:
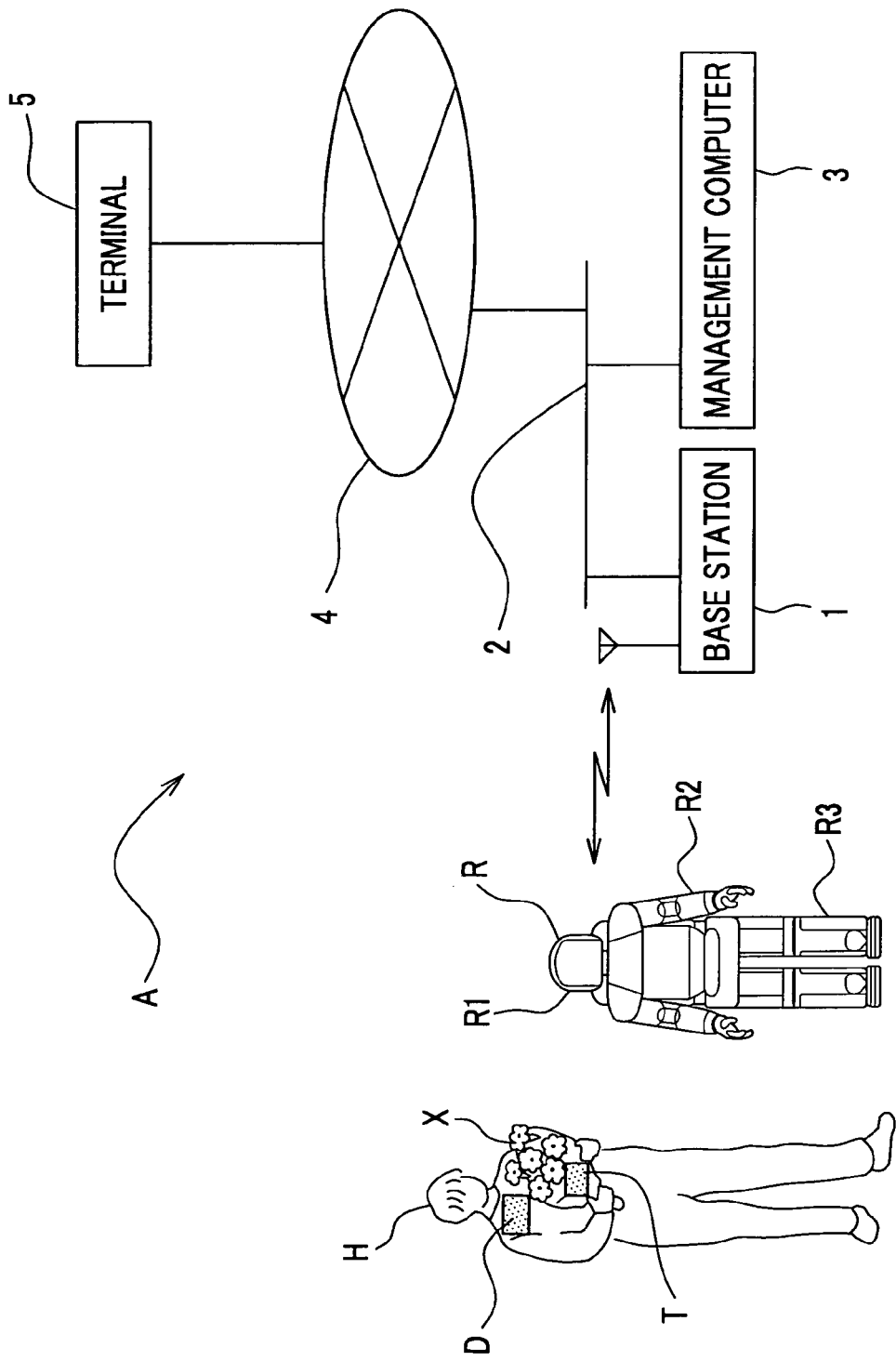
FIG. 1 is a block diagram of a message recording system including a mobile robot according to the present embodiment.

FIG. 1 is a block diagram of a message recording system including a mobile robot according to the present embodiment.

As shown in FIG. 1, the message recording system A includes a robot R, a base station 1 which communicates with the robot R by wireless, a management computer 3 which connects with the base station 1 through a robot network 2, a terminal 5 which connects with the management computer 3 through a network 4, a detection tag D provided on a person H, and a tag T provided on an object X. In this message recording system A, it is assumed that a plurality of robots R are included. Here, the detection tag D (person tag) is a wireless tag provided on a person, and the tag T (object tag) is a wireless tag provided on an object X.

The robot R according to the present invention is an autonomous mobile robot which can perform a bipedal walking. The robot R includes a head R1, an arm R2, and a leg R3, which are respectively actuated by an actuator. The robot R is adapted to perform a bipedal walking under the control of an autonomous travel controller 50 (see FIG. 2). The detail of the bipedal walking, for example, is disclosed in U.S. Pat. No. 6,401,846.

Also, pressure sensors (not shown) are provided on a hand of the arm R2 of the robot R, and the robot R flexes fingers by a certain angle to keep the hand in a clenched state, when the hand is kept in an unclenched state and a pressure exceeding a predetermined level is detected.

That is, the robot R can grab an object X with a predetermined grip when the object X is pushed against the hand of the arm R2.

Also, the robot R unclenches the robot's hand by stretching fingers, when a predetermined tensile load is detected under the condition that fingers are clenched with a gentle squeeze. That is, the robot R decreases the grip of the robot's hand when a tensile force, which is caused when the object X is pulled out from the hand, exceeds a predetermined level.

The robot R extracts a voice message from the voice uttered by a person H with the detection tag D and records the voice message on the tag T. The robot R performs a task (conveyance task) which conveys the object X with the tag T to a certain place.

This conveyance task comprises a series of tasks of: receiving the object X from the person (client) H requesting the conveyance of the object X; conveying the object X; and delivering the object X to a person (recipient) who receives the object X.

In order to perform these tasks, the robot R detects a presence of the person H with the detection tag D within surrounding area of the robot R by irradiating light and radio wave toward the surrounding area of the robot R. Then, the robot R specifies the position of the person H when the person H is detected, and approaches the person H. Next, the robot R performs a personal identification to identify who the person H is. Furthermore, the robot R hands the object X to the recipient together with the voice message obtained from the tag T.

The management computer 3 manages a plurality of robots R and controls the motion, e.g. a travel and a speech, of the robot R through the robot network 2. The management computer 3 exchanges essential information, which is information to be required for the robot R, with the robot R.

In this embodiment, for example, a name of a detected person H and a map of the area where the robot R moves around correspond to the essential information. The essential information is stored in a recording unit 200 (see FIG. 5) provided in the management computer 3.

The robot network 2 connects the base station 1, the management computer 3, and the network 4 one another, and can be represented by LAN.

The terminal 5 connects with the management computer 3 through the network 4, and the terminal 5 registers information, such as information relating to the detection tag D and the person H with the detection tag D etc., on the recording unit 200 (see FIG. 5) of the management computer 3, or corrects these information registered on the recording unit 200.

A unique identification number (tag ID) which is assigned to each detection tag D is recorded on the detection tag D.

The detection tag D is provided on a target such as a person H and receives an infrared light and a radio wave which are irradiated from the robot R for identifying the position (distance and direction) of the target.

The detection tag D generates a receipt signal including a tag ID based on the signal which is included in the received infrared light and indicates the direction of receipt and the robot ID included in the received radio wave, and reply the receipt signal to the robot R. When the robot R receives the receipt signal, the robot R computes a distance to the target and a direction of the target, based on the receipt signal. Thus, the robot R can approach the target based on the computed result.

The tag T is an IC tag capable of reading/writing by the robot R, and is attached to the object X which is transferred by the robot R. In FIG. 1, the number of the tag T is one, but the number of the tag T provided on one object X is not limited to one and any number of tags may be provided on the object X. When two tags are provided on the object X, it is preferable that one of tags T is directed in a horizontal direction and that the other of the tags T is directed in a vertical direction. This is because the influence of a radio disturbance due to the directivity of the antenna of the tag T can be decreased.

Next, the robot R and the management computer 3 will be explained in detail.

[Robot R]

Figure 2:
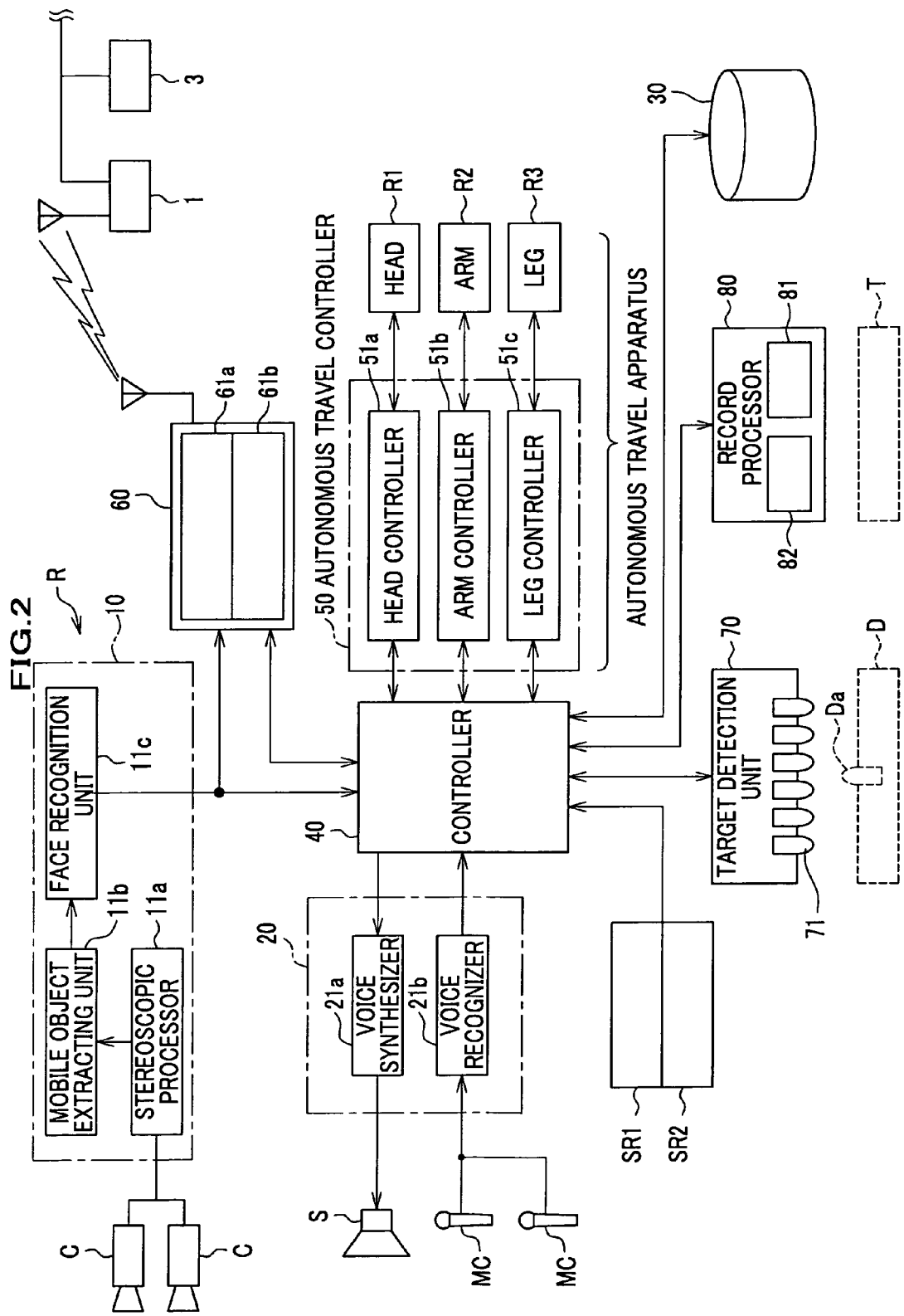
FIG. 2 is a block diagram of the robot R.

FIG. 2 is a block diagram of the robot R. As shown in FIG. 2, the robot R includes cameras C, C, a speaker S, a microphone MC, an image processor 10, a voice processor 20, a recording unit 30, a controller 40, the autonomous travel controller 50, a radio communication unit 60, a target detection unit 70, and a record processor 80, in addition to the head R1, the arm R2, and the leg R3.

The robot R further includes a gyro sensor SR1 and a GPS receiver SR2 which measure a current-position of the robot R and which serve as a current position information acquisition unit.

[Camera C]

The camera (image pickup unit) C acquires images in a form of digital format. In this embodiment, for example, a color CCD (Charge-Coupled Device) camera is adopted as the camera C. The cameras C, C are arranged in a line along a lateral direction. The images acquired by the cameras C and C are supplied to the image processor 10. In this embodiment, the cameras C, C, the speaker S, and the microphones MC are installed within the head R1 of the robot R.

[Image Processor 10]

The image processor 10 performs recognition of a person and an obstacle in the surrounding area, in order to recognize the condition of the surrounding area of the robot R based on the images acquired by the cameras C, C. This image processor 10 includes a stereoscopic processor 11a, a mobile object extracting unit 11b, and a face recognition unit 11c.

The stereoscopic processor 11a performs a pattern matching between images obtained from each camera C on the basis of one of two images acquired by the cameras C, C. In this embodiment, since the robot R has two cameras (a left-side camera and a right-side camera), one of two images is the image obtained from left-side camera and the other of two images is the image obtained from right-side camera. Thus, the pattern matching is performed between the image obtained from left-side camera and the image obtained from right-side camera.

Then the stereoscopic processor 11a computes a parallax between two images to generate a parallax image, and outputs the parallax image to the mobile object extracting unit 11b together with the image entered from the cameras C and C. Here, the computing of the parallax is performed between corresponding pixels in two images. In the parallax image, the distance from the robot R (camera C) to the target object is indicated by the difference of the brightness.

The mobile object extracting unit 11b extracts a mobile (moving) object from the image obtained by the camera C, based on data entered from the stereoscopic processor 11a. The reason why the extraction of the mobile object is performed is to perform the recognition of a person on the assumption that it is more likely that the moving object is a person.

The mobile object extracting unit 11b performs the pattern matching in order to extract the mobile object, and computes a distance for corresponding pixels in two images to generate a distance image. Here, the pattern matching is performed by comparing the current frame (image), which was obtained currently by the camera C, with the last frame (image), which is generated from several frames obtained prior to the acquisition of the current frame.

Then, the mobile object extracting unit 11b, based on the distance image and the parallax image, searches the pixels whose shift amount is large, from among the pixels within a predetermined distance from the cameras C, C (robot R). If such pixel exists, the mobile object extracting unit 11b considers that a person is within the pixels (distance), and extracts a mobile object as parallax image comprising pixels within a predetermined distance. Then, the mobile object extracting unit 11b outputs the image of the extracted mobile object.

The face recognition unit 11c extracts a human body color region from the extracted mobile object, and computes position of the face of a human in consideration of a size and shape of the extracted human body color region. The position of a hand is also computed by the same method.

The position of the recognized face is supplied to the controller 40 as information to be required for the travel of the robot R, and is used to have a communication with a person.

[Voice Processor]

The voice processor 20 includes a voice synthesizer 21a and a voice recognizer 21b.

The voice synthesizer 21a generates voice data from text information (text data), based on a command, which commands the robot R to sound a voice message and which is entered from the controller 40. Then, the voice synthesizer 21a outputs voice data to the speaker S. Here, the generation of voice data is performed by utilizing the correspondence between voice data and text information (text data) stored beforehand in the recording unit 30. Here, voice data is obtained from the management computer 3 and is stored in the recording unit 30.

The voice recognizer 21b inputs with voice data from the microphones MC and MC and generates text information (text data) from voice data. Here, the correspondence between voice data and text information is stored beforehand in the recording unit 30. Then, the voice recognizer 21b outputs text data to the controller 40.

[Recording Unit 30]

The recording unit 30 for example comprises a conventional hard disk drive etc. and stores therein essential information and an identification number and position information of the person H recognized by the robot R. Here, a name of the person H, a local map data, and data for conversation etc. are the example of essential information and are entered from the management computer 3.

[Controller 40]

The controller 40 performs an overall control of the image processor 10, the voice processor 20, the recording unit 30, the autonomous travel controller 50, the radio communication unit 60, the target detection unit 70, and the record processor 80. Mainly, the controller 40 controls the processing to record a voice message, which is extracted from the voice uttered from a person, on the tag T on the object X.

[Autonomous Travel Controller 50]

The autonomous travel controller 50 includes a head controller 51a, an arm controller 51b, and a leg controller 51c.

The head controller 51a actuates the head R1 based on a command entered from the controller 40. The arm controller 51b actuates the arm R2 based on a command entered from the controller 40. The leg controller 51c actuates the leg R3 based on a command entered from the controller 40.

Additionally, data obtained by the gyro sensor SR1 and the GPS receiver SR2 is supplied to the controller 40, and is used for deciding the motion of the robot R.

[Radio Communication Unit]

The radio communication unit 60 is a communication device to exchange data with the management computer 3. The radio communication unit 60 includes a public line communication unit 61a and a radio communication unit 61b.

The public line communication unit 61a is a wireless communication device adopting a cellular phone line or a personal handyphone system. The radio communication unit 61b is a wireless communication device adopting a short-range wireless communication technique, e.g. a wireless local area network complying with IEEE802.11b standard.

The radio communication unit 60 performs a data exchange with the management computer 3 using one of the public line communication unit 61a and the radio communication unit 61b, when a signal which commands the robot R to communicate with the management computer 3 is entered from the management computer 3.

[Target Detection Unit]

The target detection unit 70 detects a presence of the target object with the tag D within a surrounding area of the robot R, and computes the position of the target object when the target object exists in the surrounding area.

The target detection unit 70 has a plurality of light emitters 71 along the periphery of the head R1 of the robot R, i.e. light emitters 71 are arranged from front to back and side to side around the head R1. The light emitter 71 emits an infrared light which includes a signal indicating an emitter ID to identify the light emitter 71, and receives a receipt signal which is replied from the detection tag D which received the infrared light.

The light emitter 71 for example comprises a light-emitting diode. The detection tag D generates a receipt signal based on the emitter ID included in the received infrared light when some of infrared light is received. The robot R specifies the direction of the detection tag D with reference to the emitter ID included in the receipt signal.

Figure 3:
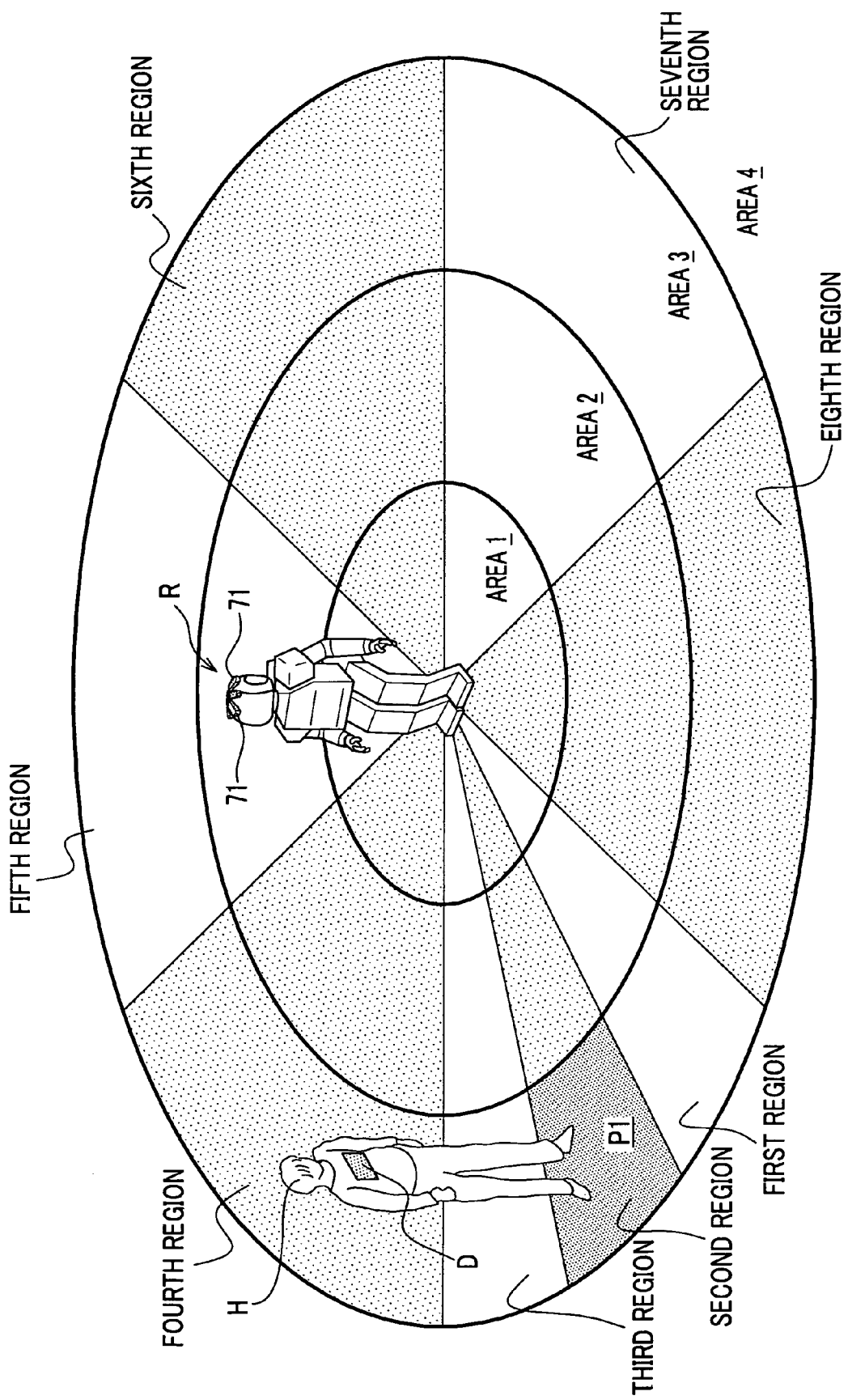
FIG. 3 is an explanatory view showing a method for specifying a position of a detection tag (or a person) by the robot R.

In this embodiment, as shown in FIG. 3, a total of eight search regions (from first region to eighth region) are established around the robot R. Here, the number of search region corresponds to the number of the light emitter 71, and a total of eight light emitters are installed on the robot R. The recording unit (not shown) in the target detection unit 70 stores a table (a direction table) which indicates the search region to which each light emitter is being directed.

The target detection unit 70 has a function to specify the distance from the robot R to the detection tag D based on the field intensity of the receipt signal which was received from the detection tag D. Thereby, the target detection unit 70 can specify the position (distance and direction) of the detection tag D based on the receipt signal.

In this embodiment, as shown in FIG. 3, a total of four areas (area 1 to area 4) are established around the robot R based on the distance from the robot R, and each area is beforehand correlated with the field intensity on the basis of the level of field intensity. A table (a distance table) which indicates the correlation between the area and the field intensity is stored in the recording unit (not shown) of the target detection unit 70.

When "Area 3" is specified based on the field intensity of the receipt signal and "Second region" is specified based on the emitter ID included in the signal, the target detection unit 70 considers that the detection tag D exists in the region (shown by P1) at which Area 3 and Second region overlap each other. Then the target detection unit 70 generates information (position information) which indicates this overlapped region. Thereby, the position of the detection tag D, i.e. the position of the person H, can be specified.

The target detection unit 70 transmits radio wave including signal indicating the robot ID from an antenna (not shown) in addition to the emission of infrared light. Thereby, the detection tag D, which receives the radio wave, can specify the robot R. Here, the detail of the target detection unit 70 and the detection tag D is disclosed in Japanese unexamined patent publication No. 2005-288573.

[Record Processor]

The record processor 80 performs a recording of predetermined information on a tag T and a reproducing of data from the tag T. As shown in FIG. 2, the record processor 80 includes a writer 81 and a reader 82.

The writer (recording unit) 81 records a message on the tag T that is extracted by a voice message extraction unit 454 of the controller 40. The writer 81 performs a writing operation in compliance with a write command from the controller 40. In this embodiment, the writer 81 records supplemental information, which is obtained together with the message, on the tag T. Here, a time of receipt of the message and a current position etc. are examples of supplemental information.

The writer 81 is, for example, disposed in the head R1 of the robot R. In this embodiment, the recording of data on the tag T can be achieved immediately, when a client or the robot R holds the tag T over the writer 81. To avoid the occurrence of the recording that is performed irrespective of the direction (position) of the tag T, in this case, it is preferable that a directive antenna is disposed at the chest of the robot R and that the recording of information is allowed only when the tag T has received radio wave from the antenna.

In this embodiment, additionally, the writer 81 and a directive antenna may be disposed on the hand. In this case, it is preferable that the writing is performed when the distance between the writer 81 and the tag T becomes shorter than a predetermined distance. That is, it is preferable that the writing is performed when the robot R grabs the object X provided with the tag T.

Additionally, the position of the writer 81 and directive antenna may be adjusted in consideration of: the positional relation (distance) between the robot R and the object X; and whether or not the client feels as an appropriate distance to hand the object X to the robot R.

The reader (reading unit) 82 performs a readout of information from the tag T and outputs the information to the controller 40. The reader 82 performs a reading operation in compliance with a read command from the controller 40. In this embodiment, the reader 82 performs a readout of supplemental information, e.g. the time of receipt of the message and a current position etc. which are obtained together with the message, from the tag T.

In this embodiment, the reader 82 may perform a readout of information from the detection tag D instead of the tag T and output the obtained information to the controller 40. Here, the arrangement of the reader 82 is similar to the arrangement of the writer 81.

[Configuration of Controller]

Figure 4:
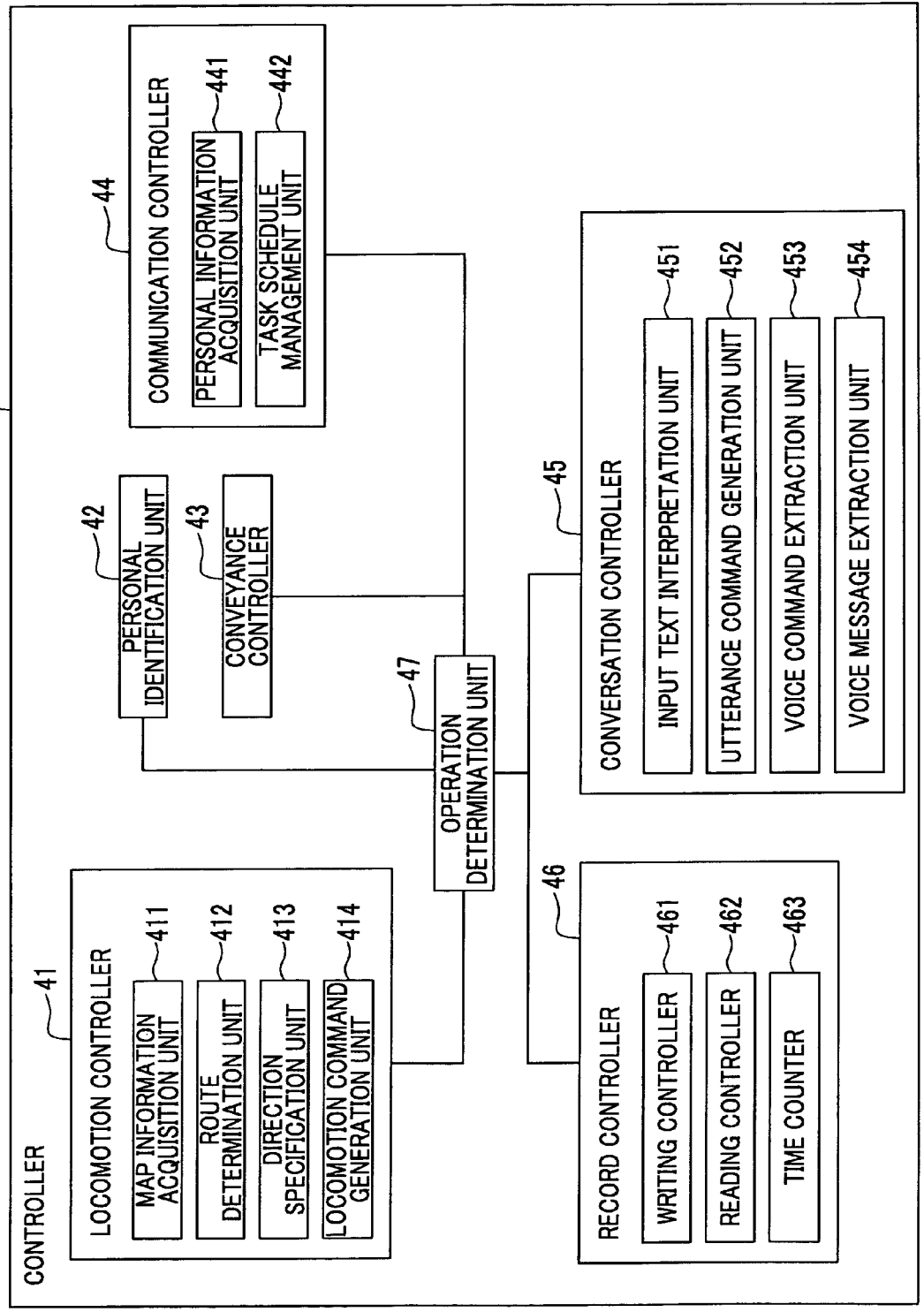
FIG. 4 is a block diagram showing a detailed configuration of the controller.

Next, the detailed configuration of the controller 40 (FIG. 2) of the robot R will be explained with reference to FIG. 4. FIG. 4 is a block diagram showing a detailed configuration of the controller 40.

As shown in FIG. 4, the controller 40 includes a locomotion controller 41, a person identification unit 42, a conveyance controller 43, a communication controller 44, a personal information acquisition unit 441, a conversation controller 45, a record processor 46, and an operation determination unit 47.

(Locomotion Controller)

The locomotion controller 41 controls a locomotion of the robot R to travel to a destination. As shown in FIG. 4, the locomotion controller 41 includes a map information acquisition unit 411, a route determination unit 412, a direction specification unit 413, and a locomotion command generation unit 414.

The map information acquisition unit 411 acquires map information from the management computer 3 (see FIG. 1). Here, map information is information relating to the current position of the robot T that is identified by the gyro sensor SR1 and the GPS receiver SR2.

The route determination unit 412 determines as a destination the position of the detection tag D detected by the target detection unit 70 and indicates the position of the detection tag D on map information which is acquired by the map information acquisition unit 411. Then, the route determination unit 412 determines the route from the current position of the robot R to the destination.

The direction specification unit 413 identifies the direction and distance the robot moves to, based on the relation between the position at a given time of the detection tag D and the position at a different given time of the detection tag D.

The direction specification unit 413 plots positions at different times in a horizontal direction of the detection tag D on X-Y plane. For example, front (forward) of the robot R may be defined as a positive direction in X-axis and right hand in a front (right) of the robot R may be defined as a positive direction in Y-axis.

The locomotion command generation unit 414 generates a command (locomotion command) for a locomotion of the robot R, and outputs the command to the autonomous travel controller 50. Here, the locomotion command also includes a command to control the head R1 and arms R2 in order to shift the center of gravity of the robot R efficiently, in addition to the command to control the leg R3. Thereby, the robot R can provide an autonomous locomotion.

[Personal Identification Unit]

The personal identification unit 42 performs a personal identification based on the tag ID obtained by the target detection unit 70. In other words, the personal identification unit 42 identifies the person having the detection tag D which has transmitted receipt signal to the robot R.

The personal identification unit 42 acquires personal information associated with the tag ID from the management computer 3 (see FIG. 1) through the radio communication unit 60, and then identifies the person based on personal information. Thereby, the robot R can have a conversation with the person based on personal information. Here, personal information obtained by the personal identification unit 42 is for example age, sex, and residence etc. in addition to a name of the person.

Here, personal information may be stored beforehand in the recording unit 30 of the robot R. In this case, the personal identification unit 42 searches the recording unit 30 using the tag ID as a key, and extracts personal information associated with the tag ID.

In this embodiment, additionally, face information of a person that is obtained by the personal identification unit 42 from the obtained image by the cameras C and C may be used for a personal identification. In this case, the obtained face information is compared with an unique face information acquired from the management computer 3 (see FIG. 1) or an unique face information registered beforehand in the recording unit 30, in order to identify the person in the obtained image. Thereby, when the personal identification unit 42 obtains both of face information and personal information, the identification of the person with the detection tag D can be achieved with high accuracy, by using both of information.

(Conveyance Controller)

The conveyance controller 43 generates a command for controlling the motion of each section to be required for a conveyance task, and outputs the command to the locomotion controller 41 and the arm controller 51b (see FIG. 1) etc.

In this embodiment, for example, the conveyance task comprises a series of following motions (scenario motions): a receiving motion by which a pickup and grasp of an object are performed; a conveyance motion by which the grasped object is transferred to a certain position; and a releasing motion by which the object is released. Here, the conveyance controller 43 instructs the conversation controller 45 to generate a command by which a predetermined conversation is performed in accordance with a situation, when the person is detected during the task of a receiving motion or a releasing motion.

In this embodiment, when the conveyance task is performed along with a conversation with a person, this task maybe called as "delivery task".

When performing delivery task, the conveyance controller 43 outputs a command or instruction to the locomotion controller 41, the arm controller 51b (see FIG. 1), and the conversation controller 45.

Then, when the conveyance controller 43 cannot detect the person within a predetermined time during the task of the receiving motion or the releasing motion, a task (absence task) for the time of absence is performed.

Here, for example, the absence task, which is performed during the task of the receiving motion when the conveyance controller 43 cannot detect the person during the task of the receiving motion, is: a processing by which the management computer 3 is notified that no client is detected; and a processing by which the robot R moves to a home position.

Also, for example, the absence task, which is performed when the conveyance controller 43 cannot detect the person during the task of the releasing motion, is: a processing by which the robot R leaves the object to a certain storage space; a processing by which the robot R hands the object to an alternate person who receives the object on behalf of the recipient; a processing by which the management computer 3 is notified that no recipient is detected and the robot R performed an optional task; and a processing by which the robot R moves to a home position.

The conveyance controller 43 controls the gripping power of the hand to grab the object, during the task of the receiving motion or the releasing motion. To be more precise, the conveyance controller 43 checks whether or not pressure sensors (not shown) detect a pressure exceeding a predetermined level, when the hand of the arm R2 of the robot R is kept in an unclenched state. The conveyance controller 43 instructs the arm controller 51b to flex fingers by a certain angle to keep the hand in a clenched state, when the pressure exceeding the predetermined level is detected. Thereby, the robot R can grab the object.

Also, the conveyance controller 43 checks whether or not the pressure sensors (not shown) detect a tensile load exceeding a predetermined level is detected under the condition that fingers are clenched with a gentle squeeze. The conveyance controller 43 instructs the arm controller 51b to decrease a gripping power of the hand when the tensile load exceeding the predetermined level is detected. Thereby, the robot R stretches fingers to change the state of the hand to an unclenched state.

(Communication Controller)

The communication controller 44 controls: the transmission of information to the management computer 3 through the radio communication unit 60; and the acquisition of required information from the management computer 3. As shown in FIG. 4, the communication controller 44 includes at least a personal information acquisition unit 441 and a task schedule management unit 442.

When the tag ID is obtained by the target detection unit 70, the personal information acquisition unit 441 transmits the tag ID to the management computer 3 and obtains personal information associated with the tag ID from the management computer 3.

When a command (interrupt task) which is not scheduled beforehand as the task of the robot R is entered from an external device, the task schedule management unit 442 transmits an interrupt task signal, which notifies the management computer 3 about the input of the interrupt task, to the management computer 3. Then, the task schedule management unit 442 obtains an interrupt task control command which indicates whether or not to accept the interrupt task from the management computer 3.

To be more precise, the task schedule management unit 442 asks about whether or not to accept the requests, when the voice command which requests the conveyance (delivery) of the object is extracted by the conversation controller 45. Next, the task schedule management unit 442 determines whether or not to take an action in response to a voice command, based on the interrupt task control command. Then, the task schedule management unit 442 instructs the conversation controller 45 to reply an appropriate response based on the judgment result.

(Conversation Controller)

The conversation controller 45 controls the voice processor 20 (see FIG. 2) to have a conversation with a person. As shown in FIG. 4, the conversation controller 45 includes an input text interpretation unit 451, an utterance command generation unit 452, a voice command extraction unit 453, and voice message extraction unit 454.

The input text interpretation unit 451 interprets textual information (text data) generated by the voice recognizer 21b of the voice processor 20 (see FIG. 2).

The input text interpretation unit 451 performs a morphologic analysis of text data and outputs the result of this analysis to the voice command extraction unit 453 and the voice message extraction unit 454.

Here, the term of "morphologic" denotes a minimum character string whose meaning will be lost if a sentence is punctuated with further short character string. The morphologic analysis is a technique to analyze a sentence by dividing a sentence into morphemes that are primitives of a sentence.

In the case of Japanese language morphologic analysis, for example, the Japanese sentence "kyounotennkihaharedesu" (English meaning: today is fine day) can be divided as "kyou no tennki ha hare desu" (or "today" "is" "fine" "day" in English).

The utterance command generation unit 452 generates a command for an utterance operation depending on the motion determined by the operation determination unit 47, and outputs the generated command to the voice synthesizer 21a of the voice processor 20 (see FIG. 2). Here, the command for this utterance operation includes textual information (text data).

The voice synthesizer 21a generates a voice data from the textual information (text data) by selecting a voice data to be required from the recording unit 30 as appropriate in compliance with the command.

The voice command extraction unit 453 extracts a voice message from the voice recognized by the voice recognizer 21b, based on the fixed phrase which is provided for acquiring a voice command (command).

To be more precise, the voice command extraction unit 453 extracts a voice command based on text data which is divided into segments by a morphologic analysis in the input text interpretation unit 451. Then, the voice command extraction unit 453 outputs the voice command to the operation determination unit 47.

For example, it is assumed that key word "hakonde" (English meaning: carry) which is one of the voice command is stored in the recording unit 30 as one of fixed phrases and that the voice command extraction unit 453 extracts, as command, a key word "hakonde" from the text data "## wo hakonde" (English meaning: please carry ## (substantive)). In this case, based on the extracted "hakonde", the operation determination unit 47 considers that the command, which orders the conveyance (delivery) of the object, was entered. Then, the operation determination unit 47 generates a command which operates the robot R to provide an appropriate motion relating to the command "hakonde".

The voice message extraction unit 454 extracts a voice message from the voice recognized by the voice recognizer 21b, based on the fixed phrase which is provided for extracting a voice message (message).

To be more precise, the voice message extraction unit 454 extracts voice message based on text data which is divided into segments by a morphologic analysis in the input text interpretation unit 451. Then, the voice message extraction unit 454 outputs the voice message to the operation determination unit 47.

Here, for example, it is assumed that fixed phrases including a keyword "tutaete" (English meaning: send a message) which is an instruction of sending a message are stored in the recording unit 30 as one of fixed phrases, and that the voice message extraction unit 454 extracts, as message, "##" which is obtained by subtracting a key word "hakonde" and a postpositional particle "to" from text data "## to tutaete" (English meaning: please give Sb a message of ##). Then, the operation determination unit 47 outputs a signal, which indicates the extraction of message, to the record processor 46.

(Record Controller)

The record controller 46 controls the record processor 80 (see FIG. 2). As shown in FIG. 4, the record controller 46 includes a writing controller 461, a reading controller 462, and a time counter 463.

The writing controller 461 generates a writing command which commands a recording of the message extracted by the voice message extraction unit 454 on the tag T, when the signal, which indicates that a message is extracted, is entered from the operation determination unit 47. Then, the writing controller 461 outputs the writing command to the writer 81 (see FIG. 2).

Thereby, the writer 81 (see FIG. 2) performs a writing of message on the tag T in compliance with the writing command.

The writing controller 461 also generates a writing command (second writing command), which commands a recording of supplemental information relating to a time and a current position on the tag T together with the message. Here, in this embodiment, supplemental information relating to a time is obtained by the time counter 463 and supplemental information relating to the current position is measured by the gyro sensor SR1 or the GPS receiver SR2.

The reading controller 462 generates a read instruction which commands the reader 82 to perform a readout of the message recorded on the tag T, when the signal which is a notice of the timing of an utterance of the message is entered from the operation determination unit 47. Then, the reading controller 462 outputs the read instruction to the reader 82 (see FIG. 2).

Thereby, the reader 82 (see FIG. 2) can perform a readout of the message extracted by the voice message extraction unit 454. Also, the reading controller 462 outputs the message (text data) obtained by the readout by the reader 82 (see FIG. 2) to the input text interpretation unit 451. Thus, the message obtained by the readout by the reader 82 (see FIG. 2) is output as a synthesized message from the speaker S (see FIG. 2).

In this embodiment, the reading controller 462 may generate a read command at an arbitrary timing and store temporarily the message (text data) obtained by the readout by the reader 82 (see FIG. 2) in the recording unit 30. In this case, the message (text data) is extracted from the recording unit 30 and is output to the input text interpretation unit 451, when the signal which is a notice of the timing of an utterance of the message is entered from the operation determination unit 47.

Similarly, the signal, which is a notice of the timing of an utterance of the message and is generated by the utterance command generation unit 452, may be stored temporarily. In this case, the temporarily stored signal is output to the voice synthesizer 21a when the operation determination unit 47 judges as the timing of the utterance. Thereby, the time interval from the timing of the utterance to the actual utterance of the robot R can be short.

(Operation Determination Unit)

The operation determination unit 47 performs judgment with regard to various types of motion, and outputs a predetermined command to the locomotion controller 41, the personal identification unit 42, the conveyance controller 43, the communication controller 44, the conversation controller 45, and the record controller 46.

As an example of the command with regard to the conveyance controller 43, for example, commands of a series of scenario for achieving a conveyance task can be example.

As examples of the command with regard to the record controller 46, a command, which instructs the writing of a message (a signal which indicated the acquisition of a message) and a command, which instructs the reading of a message (a signal which is a notice of the timing of an utterance of the message) etc., can be example.

As an example of the command with regard to the locomotion controller 41, a command to move from the current position to the position (a direction and distance) of the detection tag D can be example.

The operation determination unit 47 generates data (status information) with regard to the condition of the robot R at a predetermined interval. In this status information, information with regard to the current position obtained by the gyro sensor SR1 and GPS receiver SR2 and information with regard to the level of the battery as well as the robot ID for identifying the robot R are included. The status information generated in the operation determination unit 47 is supplied to the management computer 3 by the communication controller 44.

[Management Computer]

The management computer 3 of FIG. 1 mainly manages tasks to be performed by the robot R.

Figure 5:
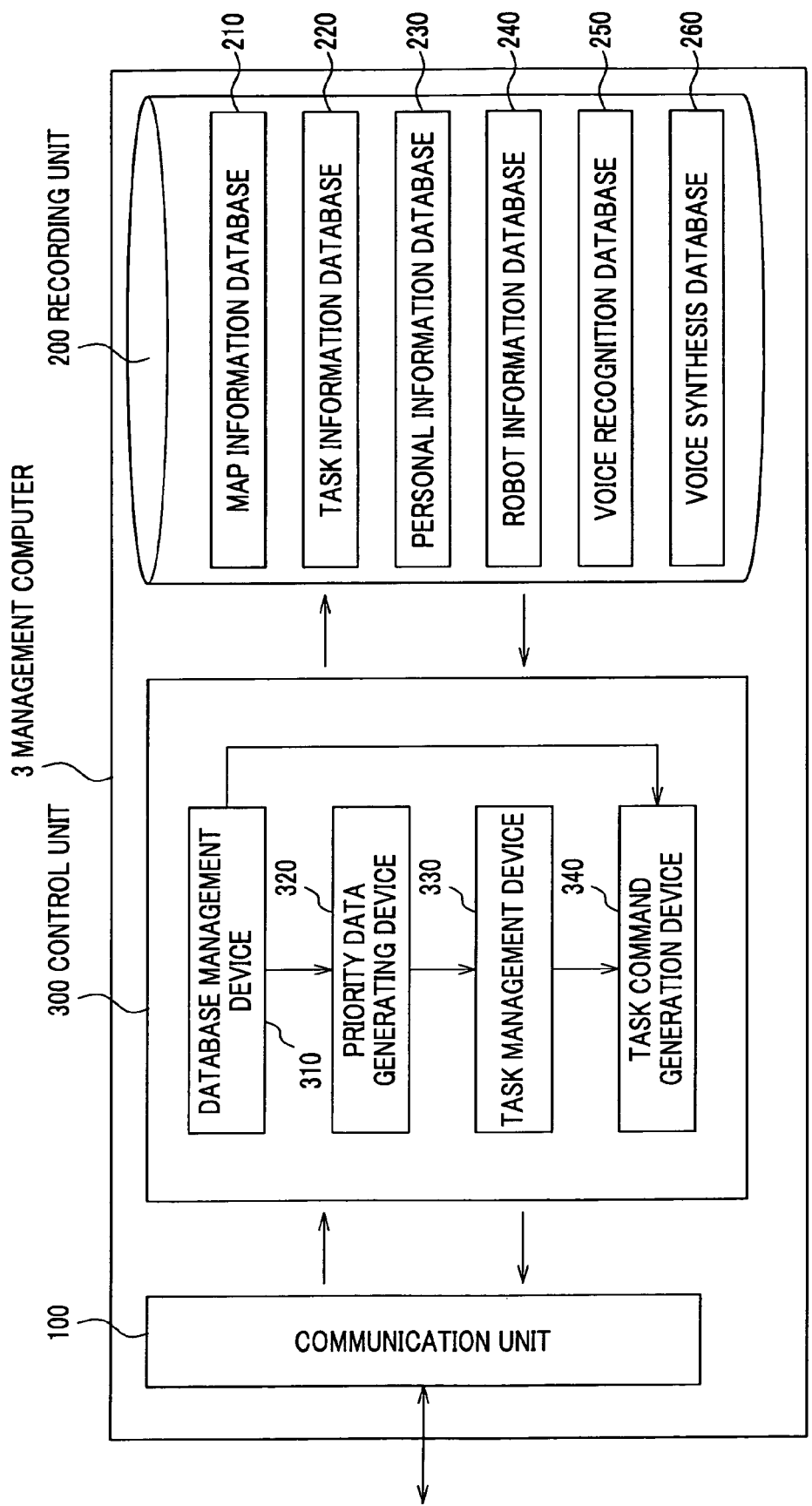
FIG. 5 is a block diagram showing a configuration of the management computer of FIG. 1.

FIG. 5 is a block diagram to explain the function of the management computer of FIG. 1. As shown in FIG. 5, the management computer 3 includes a communication unit 100, the recording unit 200, and a control unit 300.

(Communication Unit)

The communication unit 100 is an interface for communicating with the robot R through the base station 1 (see FIG. 1). The communication unit 100 outputs status information entered from the robot R to a database management device 310. Here, the communication unit 100 also communicates with the terminals 5 through the network 4 (see FIG. 1).

[Recording Unit]

The recording unit 200 holds information to be required for the control of the robot R. The recording unit 200 includes a map information database 210, a task information database 220, a personal information database 230, a robot information database 240, a voice recognition database 250, and a voice synthesis database 260.

[Map Information Database]

The map information database 210 is a database including map information (local map) of the area wherein the robot R performs tasks (task area).

In this map information database 210, information of objects within the task area is correlated with the position within the task area of object and is stored. Here, a passage, stairs, elevators, and rooms etc., are example of the object. In this embodiment, an office floor is established as a task area, and information relating to the positions of seating etc. is also stored in the map information database 210.

(Task Information Database)

The task information database 220 is a database storing information with regard to tasks to be performed by the robot R. In this embodiment, the task information database 220 includes following information items: a task ID which is a unique identification number assigned to each task; a priority which is a priority level of a task to performed; an importance of a task; a robot ID which is a unique identification number assigned to the robot R; a content of task such as a conveyance; a task start position within the task area; a task end position within the task area;

a progress of a task; a start time of a task; an end time of a task; and a status which indicates a state of task, e.g. "finished", "in progress", and "queuing".

(Personal Information Database)

The personal information database 230 is a database storing personal information. Here, full name, age, sex, and address etc. are examples of this personal information. Here, each personal information is correlated with tag ID and is stored in the personal information database 230. That is, tag ID is used as a key (searching key) for searching the personal information database 230.

In this embodiment, another serial number may be adopted as a searching key instead of the tag ID. Also, one of personal information, e.g. name etc., may be used as a searching key when one of personal information is recorded beforehand in the detection tag D.

(Robot Information Database)

The robot information database 240 is a database for storing data (status information) with regard to the condition of the robot R.

The robot information database 240 includes following information items: information relating to a current position; task information; information relating to a remaining battery level; and information relating to an occurrence of an error on an automotive drive system of the robot R. In this embodiment, each of information is organized by being associated with the robot ID.

Here, the updating of the contents of each information item to be stored in the robot information database 240 is performed by the database management device 310 of the control unit 300 based on status information transmitted from the robot R.

(Voice Recognition Database)

The voice recognition database 250 is a database for storing data to be used for voice recognition by the robot R.

(Voice Synthesis Database)

The voice synthesis database 260 is a database for storing data to be used for synthesizing a voice to be uttered by the robot R.

[Control Unit]

The control unit 300 manages and controls an overall processing of the management computer 3.

The controller 30, as shown in FIG. 5, includes the database management device 310, a priority data generating device 320, a task management device 330, and a task command generation device 340.

<Database Management Device>

The database management device 310 performs a recording of data to each database 210-260 of the recording unit 200, and also performs an updating of data stored in each database 210-260.

The database management device 310 generates signal (command request signal) which commands a generation of instruction, when the task information included in the status information indicates the completion of the task. Then, the database management device 310 outputs the command request signal to the task command generation device 340.

Additionally, the database management device 310 updates the task information database 220 when the signal (task information signal) which requests a registration of new task or an updating of a task is entered from the terminal 5 through the communication unit 100. Then, the database management device 310 generates the signal (task update signal) which indicates the completion of the updating and outputs the task update signal to the priority data generating device 320.

<Priority Data Generating Device>

The priority data generating device 320 determines a priority of tasks which is performed by the robot R. The priority data generating device 320 determines a priority of the task which is in queuing from among tasks registered in the task information data base 220, when the task update signal is entered.

Here, the determination of the priority is performed in consideration of: an importance of a task established at the time of registering the task on the task information database 220; a distance between the robot R in the nearest position of the task start position and the task start position; a time interval between current time and start time of the task, or between current time and end time of the task.

Then, the priority data generating device 320 generates a signal (schedule request signal) which commands a scheduling of the task which is in queuing from among the tasks registered in the task information database 220.

<Task Management Device>

The task management device 330 establishes a plan (task schedule) of tasks to be performed by the robot R for each robot R. The task management device 330 determines the robot R to which each task is performed, based on the priority determined for each task, and also determines an execution sequence of tasks assigned to the robot R for each robot R.

The task management device 330 generates a signal (command request signal), which commands a generation of a task command for the robot R specified by the robot ID, based on the task information database 220, and outputs the command request signal to the task command generation device 340.

The task management device 330 determines whether or not to accept an interrupt task in consideration of the tasks stored in the task information database 220, when a signal (interrupt task signal) which refers to the task schedule is entered from the robot R. Then, the task management device 330 generates a signal (judgment signal), which indicates the result of the determination, and outputs the judgment signal to the task command generation device 340. Here, for example, a signal with high level or low level may be assigned to the judgment signal.

<Task Command Generation Device>

The task command generation device 340 generates a task command (data) which instructs the robot R to perform the task.

The task command generation device 340 checks the task registered in the task information database 220 based on the robot ID included in the command request signal, when the command request signal is entered from the database management device 310 or the task management device 330.

Then, the task command generation device 340 generates a task command, by which the robot R performs a task, with reference to data of each information items of the task information database 220. Then, the task command generation device 340 outputs the task command to the robot R identified by the robot ID through the communication unit 100.

When the judgment signal is entered from the task management unit 330, the task command generation device 340 generates an interrupt task control command, which indicates whether or not to allow the insertion of the interrupt task, based on the judgment signal. Then, the task command generation device 340 outputs the derived action command to the robot R through the communication unit 100.

The task command generation device 340 acquires information relating to the position of the client and recipient with reference to the personal information database 230, when the task is a conveyance of the object from the client to the recipient. Then, the task command generation device 340 extracts map information to be required from the map information database 210 based on the acquired information and adds it into the task command.

[General Operation In Message Recording System]

The general operations of the robot R and the processing by the management computer 3 in the message recording system A of FIG. 1 will be explained.

Firstly, the controller 40 (see FIG. 2) of the robot R obtains a task command from the management computer 3 through the radio communication unit 60, and the robot R handles a predetermined task defined by the task command.

That is, each robot R provides, in accordance with the schedule, each operation in order of: searching the route from the current position (home position) of the robot R to the position (destination) at which the task is started; moving to the destination; performing the operation defined by the task; searching the route from the position, at which the task is terminated, to the home position; and moving to the home position.

In this embodiment, the robot R determines the route to the destination with reference to map data stored in the map information database 210 (see FIG. 5), and the robot R can arrive at the destination via the shortest route while detecting the distinction targets using the target detection unit 70 (see FIG. 2) during the travel of the robot R.

Then, the controller 40 of the robot R generates data (status information) with regard to the condition of the robot R at a predetermined interval, and outputs the status information to the management computer 3 through the radio communication unit 60. Then, the management computer 3 registers the status information entered through the communication unit 100 in the robot information database 240 by the database management device 310.

[Operation Relating to the Conveyance Task In Message Recording System]

(Assumption)

FIG. 6A is an explanatory view of the conveyance of the object by the robot shown in FIG. 1 wherein the receipt of the object is shown. FIG. 6B is an explanatory view of the conveyance of the object by the robot shown in FIG. 1 wherein the transfer of the object is shown.

Here, each of the client H1 and recipient H2 within an office is assumed as a person H who has a communication with the robot R. In this embodiment, the personal information (name etc.) of the person with the detection tag D is input beforehand to the personal information database 230 (see FIG. 5) of the management computer 3 through the network 4 by an operator of the terminal 5 (see FIG. 1). Also, the detection tag D1 (D) and the detection tag D2 (D) are respectively attached on the client H1 and the recipient H2, after the input of the personal information in the personal information database 230.

The task (conveyance task) to be performed by the robot R is a delivery by which the robot R receives an object X from the client H1 and hands the object X to the recipient H2.

Task information with regard to the conveyance task is input beforehand to the task information database 220 (see FIG. 5) of the management computer 3 through the network 4 by the operator of the terminal 5 (see FIG. 1).

To be more precise, the operator of the terminal 5 inputs names of the client and the recipient in addition to the delivery command. In this case, the locations of the client and recipient are also input beforehand or simultaneously to the task information database 220. After the completion of the input through the terminal 5, each robot R stays at a predetermined position (home position) established to each robot R. Here, the object X is provided with the tag T and a bunch of flowers is used as an example of the object X. In this embodiment, however, various kinds of objects are adoptable as long as the grabbing by the robot R is enabled.

(Processing by Management Computer)

The instruction of the conveyance task by the management computer 3 will be explained with reference to FIG. 7 and appropriately with reference to FIG. 5.

Figure 7:
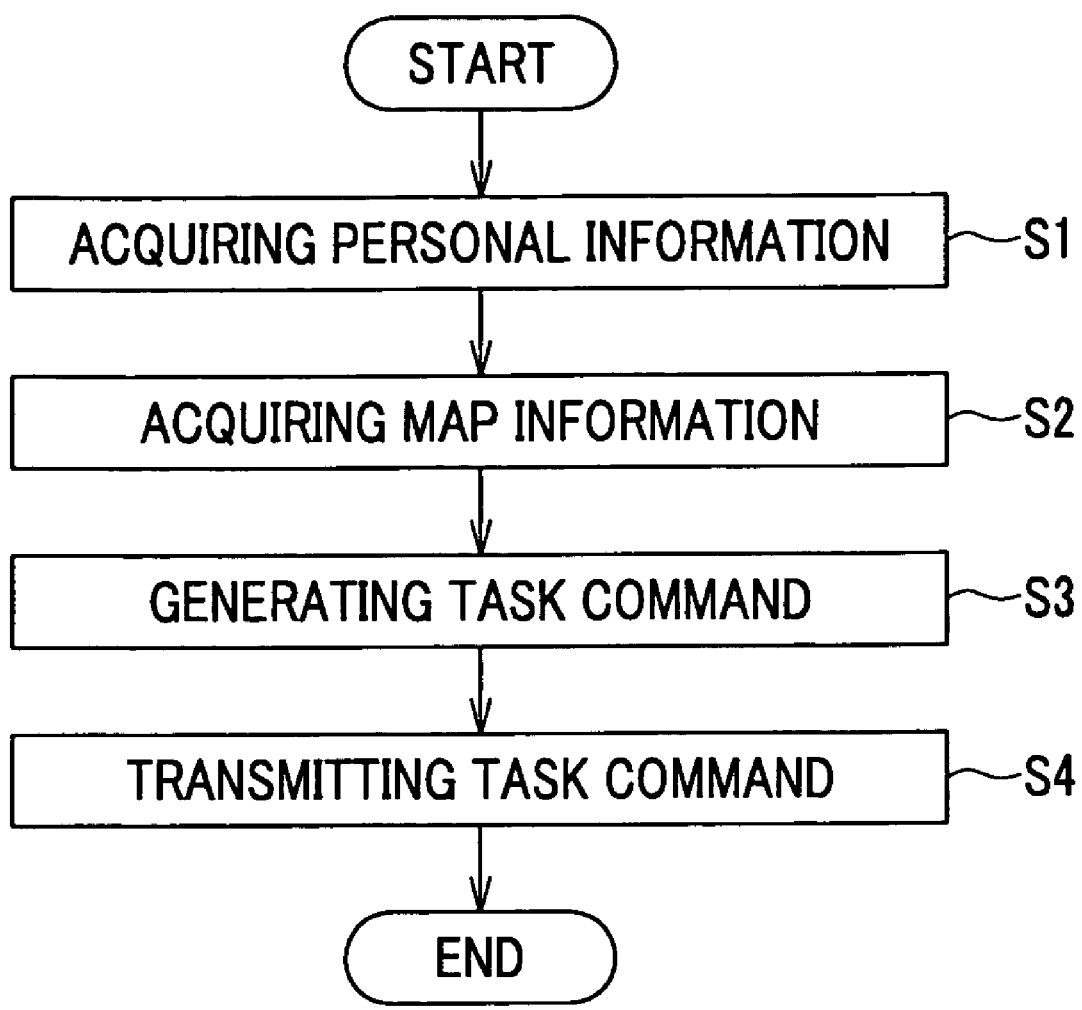
FIG. 7 is a flow chart explaining the instruction during a conveyance task by the management computer.

FIG. 7 is a flowchart explaining the instruction during the conveyance task by the management computer.

In the management computer 3, the task management device 330 obtains the task information of the conveyance task with reference to the task information database 220. To be more precise, the task management device 330 obtains the robot ID of the robot R, by which the predetermined conveyance task is performed, and the information (ID or name) relating to the client and recipient.

In the management computer 3, firstly, the database management device 310 obtains personal information of the client and recipient from the personal information database 230, based on the task information of the conveyance task (Step S1). To be more precise, the database management device 310 obtains the location and name of the client and recipient from the personal information database 230.

Then, in the management computer 3, the database management device 310 obtains map information around the locations of the client and recipient from the map information database 210 (Step S2). To be more precise, the database management device 310 obtains the seat locations within the office of the client and receiver in addition to local map data (map within the office).

Then, the task management device 330 outputs a command request signal to the task command generation device 340. Thereby, in the management computer 3, the task command generation device 340 generates task command including map information (Step S3). Then, in the management computer 3, the task command generation device 340 transmits the task command to the robot R specified by the robot ID through the communication unit 100 (Step S4).

(Motion of Robot In Accordance with Task Command)

Next, the motion of the robot R when the robot R performs the conveyance task will be explained with reference to FIG. 8 and appropriately with reference to FIG. 2 and FIG. 4.

Figure 8:
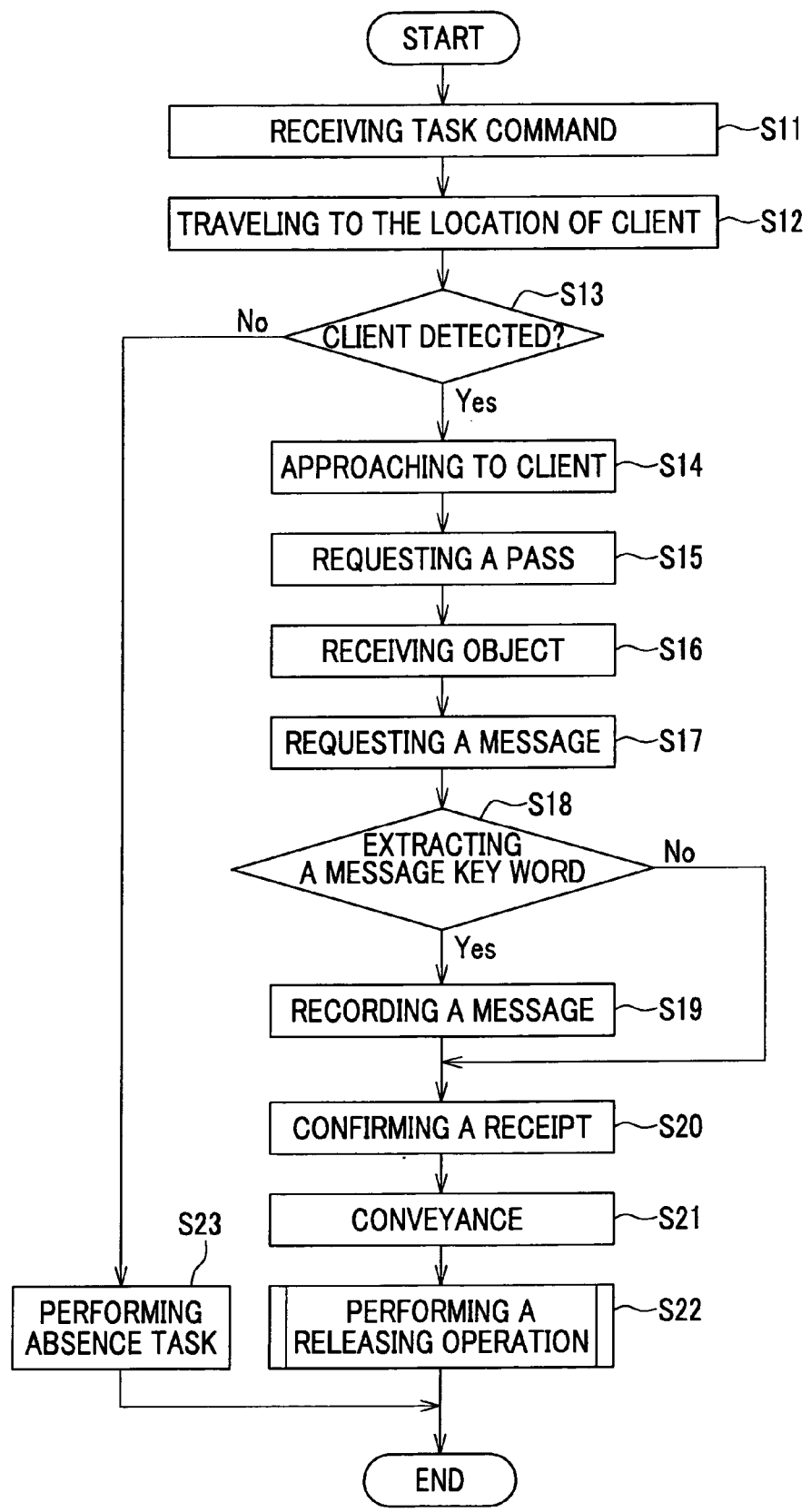
FIG. 8 is a flow chart showing the motion of the controller when the robot handles a conveyance task.

FIG. 8 is a flow chart showing the motion of the controller when the robot handles a conveyance task.

In the controller 40, the communication controller 44 receives the task command from the management computer 3 through the radio communication unit 60 (Step S11). Then, in the controller 40, the operation determination unit 47 recognizes the contents of the task command as a conveyance task, and outputs the command, which instructs the robot R to perform the conveyance task, to the conveyance controller 43. Thereby, a series of scenario motion is performed by the conveyance controller 43.

That is, the following processing is performed in the controller 40.

Firstly, the robot R travels to the location of the client under the control of the locomotion controller 41 (Step S12). In this case, the locomotion controller 41 searches the route to the destination (location of the client), and outputs a locomotion command to the autonomous travel controller 50.

When it is judged that the robot R arrives at the destination, the personal identification unit 42 checks whether or not the client is detected (Step S13). When the client is detected (Step S13, Yes), the robot R approaches to the client under the control of the locomotion controller 41 (Step S14). Then, the controller 40 instructs the autonomous travel controller 50 to change the posture of the robot R into the posture for receiving an object.

In the controller 40, the conversation controller 45 requests the client to pass the object to the robot R (step S15).

To be more precise, in the conversation controller 45, the utterance command generation unit 452 outputs the command for the utterance to the voice synthesizer 21a (see FIG. 2). Thereby, a voice message is generated by the voice synthesizer 21a based on voice data, which is provided for requesting the pass of the object and is stored in the recording unit 30, and is output from the speaker S as a voice. In this embodiment, for example, a voice message, e.g. "Please pass me the object", is output from the speaker S.

In this embodiment, additionally, in order to notify the person (H1) the purpose of visit, it is preferable that the robot R outputs the sound message having the meaning of "I came here to receive the object to be delivered to Ms. H2 from you (H1)".

In the controller 40, the conveyance controller 43 changes and keeps the hand in a clenched state, when a pressure exceeding a predetermined level is detected at the hand of the arm R2 (see FIG. 1). Thus, the robot R receives an object by fingers of the arm R2 (Step S16).

Then, in the controller 40, the conversation controller 45 requests a message (Step S17). To be more precise, for example, the robot R outputs the voice message having a meaning of "May I take a message for Ms. H2?".

In the controller 40, the voice message extraction unit 454 extracts "thank you" as a message, when the client H1 replies to the robot's voice message and utters voice message 601 "Tell Ms. H2 thank you" as shown in FIG. 6A.

In the controller 40, on the other hand, the operation determination unit 47 checks whether or not a voice message is extracted by the voice message extraction unit 454 (Step S18). In the controller 40, the writing controller 461 generates a writing command which instructs to write a message on the tag T, when a voice message is extracted (Step S18, Yes).

Thus, the writer 81 (see FIG. 2) writes the message on the tag T (Step S19). That is, the updating of information on the tag T is achieved. Then, in the controller 40, the operation determination unit 47 confirms the receipt of the message (Step S20).

That is, in the controller 40, the conversation controller 45 controls the conversation which is provided for at the time of the receipt of the message. To be more precise, the robot R outputs the voice message "I will give Ms. H2 your message Thank you.", to recite the message of the client (H1).

In the controller 40, the operation determination unit 47 checks whether or not the receipt of the object X is finished (step S20), when the voice message extraction unit 454 does not extract a voice message (step S18, No).

Then, in the controller 40, the conversation controller 45 controls the conversation which is provided for at the time of the receipt of the object X. To be more precise, the robot R outputs the voice message "I have received the object X for Ms. H2 and have not received a message for Ms. H2".

Following the Step S20, the controller 40 conveys the object X to the destination (Step S21). To be more precise, in the controller 40, the locomotion controller 41 searches the route to the location of the recipient, and controls a travel of the robot R to the location of the recipient. Here, since the processing at this time is the same processing in the Step S12, the detailed explanation of the processing will be omitted.

Then, in order to complete the delivery, the object release processing is performed at the location of the recipient (Step S22).

In this embodiment, an absence task, which is a processing at the time of absence, is performed by the conveyance controller 43 (Step S23), when the personal identification unit 42 of the controller 40 cannot detect the client (Step S13, No) That is, for example, the controller 40 performs the processing of: notifying the management computer 3 that the client is not detected; and controlling the robot R to the home position. (Object Release Processing)

Next, an object release processing performed in the step S22 will be explained with reference to FIG. 9 and appropriately with reference to FIG. 2 and FIG. 4.

Figure 9:
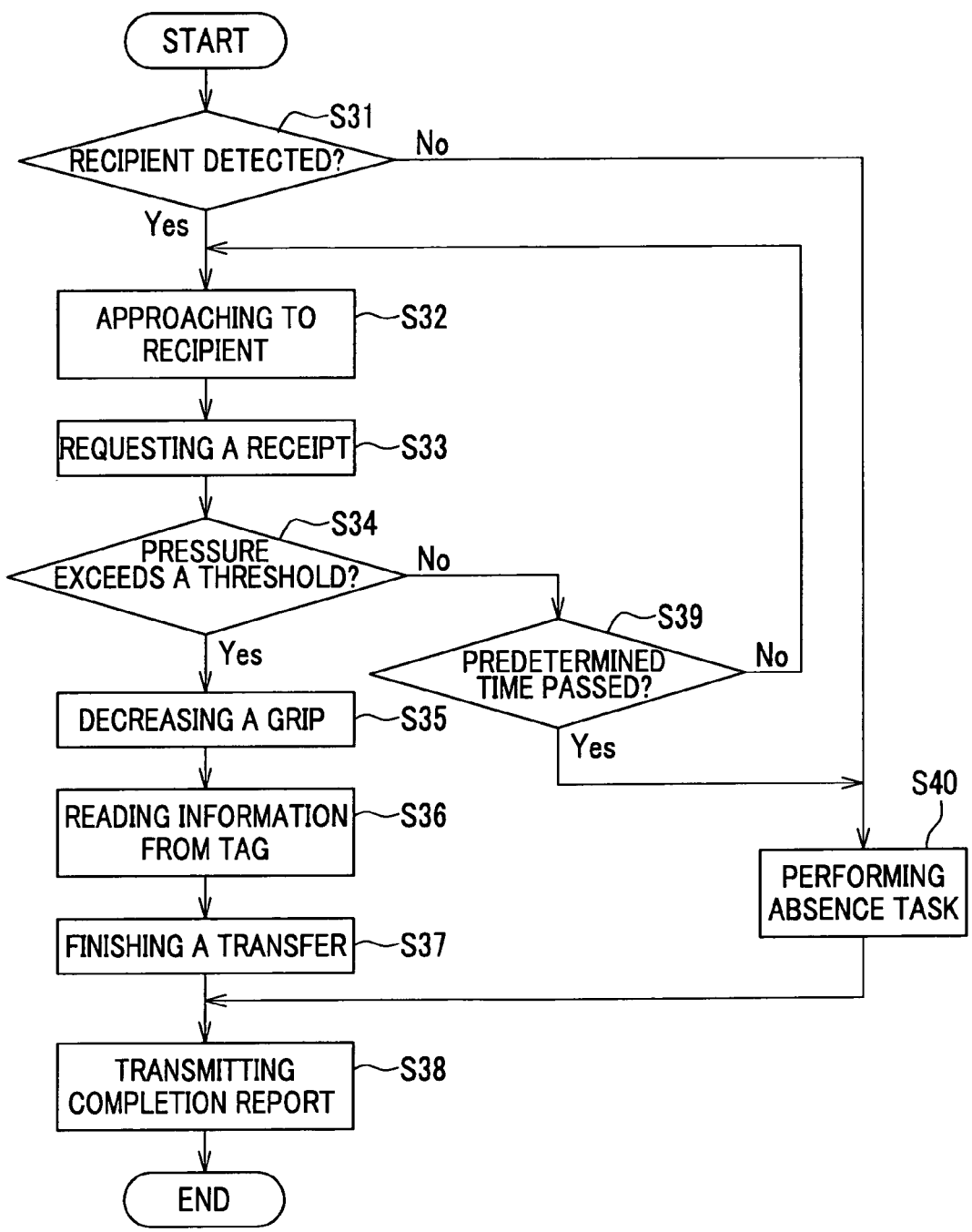
FIG. 9 is a flow chart showing the detail of the object release processing shown in FIG. 8.

FIG. 9 is a flow chart showing the detail of the object release processing shown in FIG. 8.

Firstly, in the controller 40, the personal identification unit 42 checks whether or not the recipient is detected (step S31). When the recipient is detected (Step S31, Yes), the robot R approaches the recipient under the control of the locomotion controller 41 of the controller 40 (Step S32), and requests the recipient to receive the object by the conversation controller 45 (Step S33).

Here, since processings in the step S31 to the step S33 are substantially the same as the processings in the step S13 to the step S15 shown in FIG. 8, respectively, the explanation of each processing is omitted.

In this case, in the step S33, the voice synthesizer 21a obtains voice data, which is provided for requesting the receipt of the object to the recipient, from the recording unit 30 and synthesizes the voice data. Then, the synthesized voice data is output from the speaker S as a voice.

In this embodiment, for example, a voice message "Please receive the object" is output from the speaker S. In this embodiment, additionally, to tell the visit purpose before the output of the voice message, it is preferable that the robot R output the voice message "I came here to deliver the object from Mr. H1 to you (H2)".

Following to the step S33, in the controller 40, the conveyance controller 43 checks whether or not a tensile load exceeding a predetermined level is applied to the hand of the arm R2 (see FIG. 1). When the tensile load exceeding a predetermined level is detected (step S34, Yes), the conveyance controller 43 decreases a grip (step S35). Thereby, since the robot R stretches fingers to restore an unclenched state, the recipient can receive the object X.

Then, in the controller 40, the reading controller 462 generates the record command in compliance with the read command from the operation determination unit 47, and outputs the record command to the reader 82 (see FIG. 2). Thereby, the reader 82 performs a readout of information from the tag T (Step S36).

Then, in the controller 40, the conversation controller 45 outputs the voice message having the meaning of the finish of the pass of the object X (step S37). In this case, the reading controller 462 obtains message (text data) from the tag T and outputs the message to the input text interpretation unit 451, when the message for the recipient is stored in the tag T.

Thus, in the controller 40, the voice synthesizer 21a outputs the message acquired by the reader 82 (see FIG. 2) from the speaker S as sound. For example, as shown in FIG. 6B, the voice message 612 "He (Mr. H1) said thank you" including the message "thank you" is output from the speaker S.

In this embodiment, additionally, it is preferable that the robot R outputs the voice message 611 including the time and place of the receipt of the message as shown in FIG. 6B. For example, it is preferable that the robot R outputs the voice message 611 "I have received this at the entrance at 10:00 A.M. on December 12". In this case, when message is not received in the tag T, the robot R can simply output the voice message 611 regarding receipt time and receipt location as the voice message which is a sign of the finish of the delivery.

In the controller 40, the operation determination unit 47 generates a signal (completion report) which indicates the completion of the conveyance task, when it is judged that the output of the message is completed. Then, the operation determination unit 47 outputs the completion report to the management computer 3 through the communication controller 44 (Step S38).

Following the step S34, the operation determination unit 47 of the controller 40 checks whether or not a predetermined time has passed from the request of the receipt (step S39), when the conveyance controller 43 distinguishes that the tensile load applied to the hand of the arm R2 is below the predetermined level (step S34, No).

The processing by the controller 40 is returned to the step S32 when the predetermined time has not passed from the request of the receipt (step S39, No). The conveyance controller 43 of the controller 40 performs the absence task (step S40), when the recipient does not receive the object immediately and the predetermined time has passed from the request of the receipt (step S39, Yes).

That is, the controller 40 performs the processing as follows: the processing by which the object is conveyed to the certain storage space; the processing by which the object is passed to an alternative recipient; the processing by which the management computer 3 is notified that the recipient is not detected and that the other action is under operation; and the processing to move to the home position. Additionally, the processing proceeds to the step S40 when the personal identification unit 42 cannot detect the recipient (step S31, No).
(Motion of Robot Under Interrupt Task)

Figure 10:
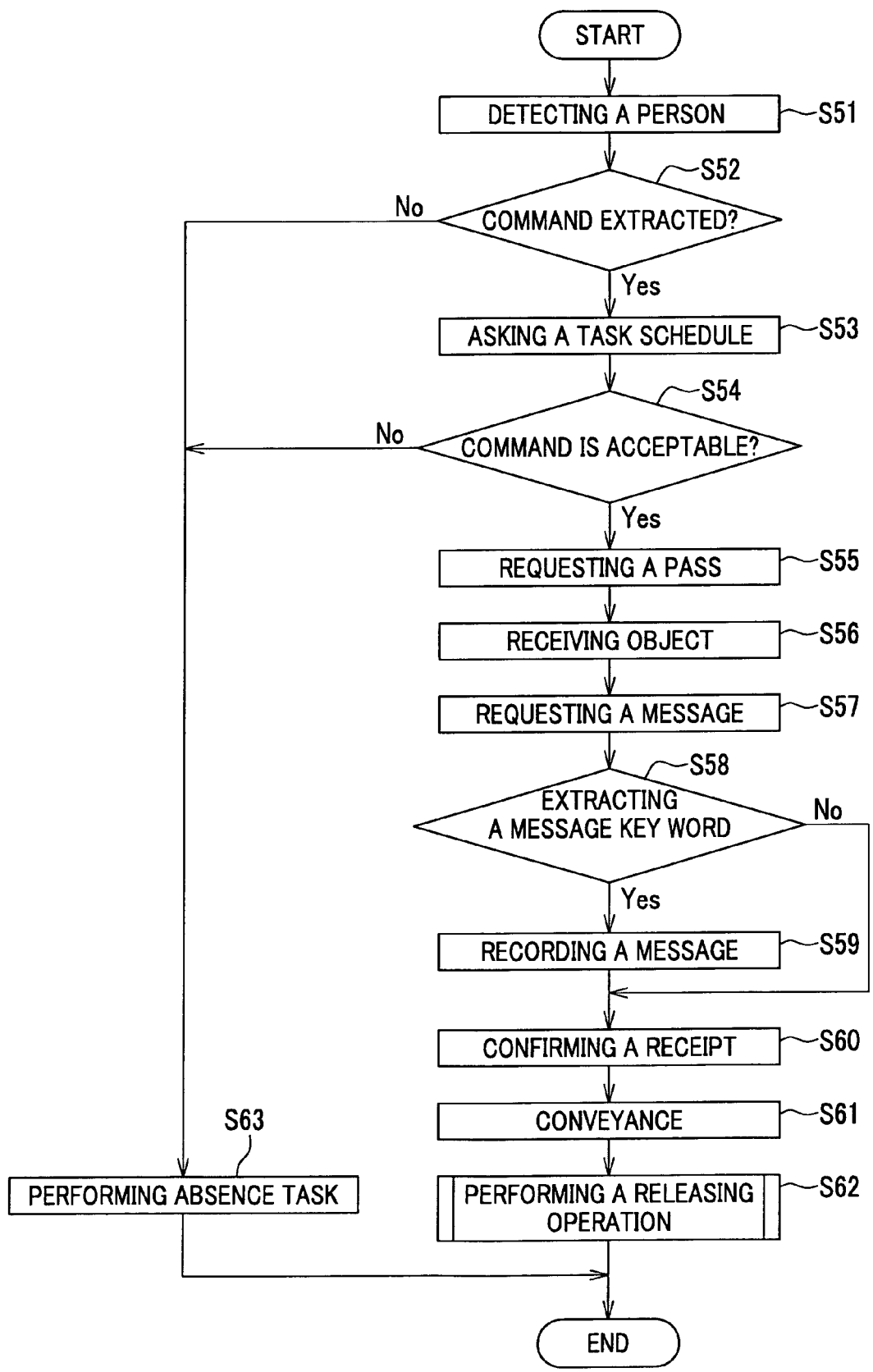
FIG. 10 is a flow chart showing the operation of the delivery task involving the interrupt task.

FIG. 10 is a flowchart indicating the processing by the controller of the robot that is performed under the interrupt task. Here, it is assumed that the task is under proceeding by the robot R or the robot R is in a waiting state. Here, a conveyance task, a receptionist task, a battery charge task etc. are example of a predetermined task. The robot is in an operation state or a static state.

The personal identification unit 42 of the controller 40 detects the person (step S51). The operation determination unit 47 of the controller 40 checks whether or not an instruction is extracted by the voice command extraction unit 453 (step S52) Here, the instruction uttered by the person is, for example, the instruction of the conveyance such as "please deliver this object to Mr. X". In this case, the voice command extraction unit 453 identifies the person's name as "Mr. X" who is a recipient.

The task schedule management unit 442 of the controller 40 asks the management computer 3 about the current task schedule (step S53), when it is judged that an instruction was extracted (step S52, yes). To be more precise, the task schedule management unit 442 transmits the interrupt signal to the management computer 3.

The task management device 330 of the management computer 3 determines whether or not to allow the interrupt task. The task command generation device 340 generates the command which indicates whether or not to allow the insertion of the task. Then, the task command generation device 340 outputs the command to the robot R specified by the robot ID through the communication unit 100.

The task schedule management unit 442 of the controller 40 checks whether or not the extracted instruction is acceptable based on the command (step S54).

The conversation controller 45 of the controller 40 requests the person to pass the object (step S55), when the extracted instruction is acceptable (step S54, yes). Here, since processings in the step S55 to the step S62 are substantially the same as each processing in the step S15 to the step S22 shown in FIG. 8, respectively, the explanation of each processing is omitted.

However, the controller 40 outputs the ID of the recipient to the management computer 3 at the predetermined time before the conveyance of the step S61. Here, the ID is an unique identification number corresponding to the name (e.g. Mr. X etc.) of the recipient extracted in the step S52 by the voice command extraction unit 453. Then, the management computer 3 searches the map information database 210 (see FIG. 5) using the ID as a key to obtain the map information relating to the location of the recipient. Then, the management computer 3 transmits the map information to the robot R, and thus the robot R can travel to the location of the recipient.

The conversation controller 45 of the controller 40 performs a response processing (step S63), when the extracted instruction is not acceptable (step S54, No).

In this response processing, the voice synthesizer 21a obtains voice data, which is provided for when the extracted instruction is not acceptable, from the recording unit 30, and synthesizes the voice data. Then, the synthesized voice data is output from the speaker S as a voice.

In this embodiment, for example, a voice message, e.g. "sorry, I cannot accept your instruction", is output from the speaker S.

Also, the processing in the controller proceeds to the step S63, when it is judged that command is not extracted by the operation determination unit 47 (Step S52, No). In this case, for example, the robot R replies the response, which is provided for when the input is considered as greetings, to the person.

Although there have been disclosed what are the patent embodiment of the invention, it will be understood by person skilled in the art that variations and modifications may be made thereto without departing from the scope of the invention, which is indicated by the appended claims.

In the above described embodiment, for example, the message is extracted from the sound input from the microphone MC and MC, when recording a message on the tag T. The message may be extracted from the image acquired by the cameras C and C (see FIG. 2).

Furthermore, means for determining the motion based on the tag ID identified by the personal identification unit 42 (see FIG. 4) or the acquired message may be provided on the robot R.

Figure 11:
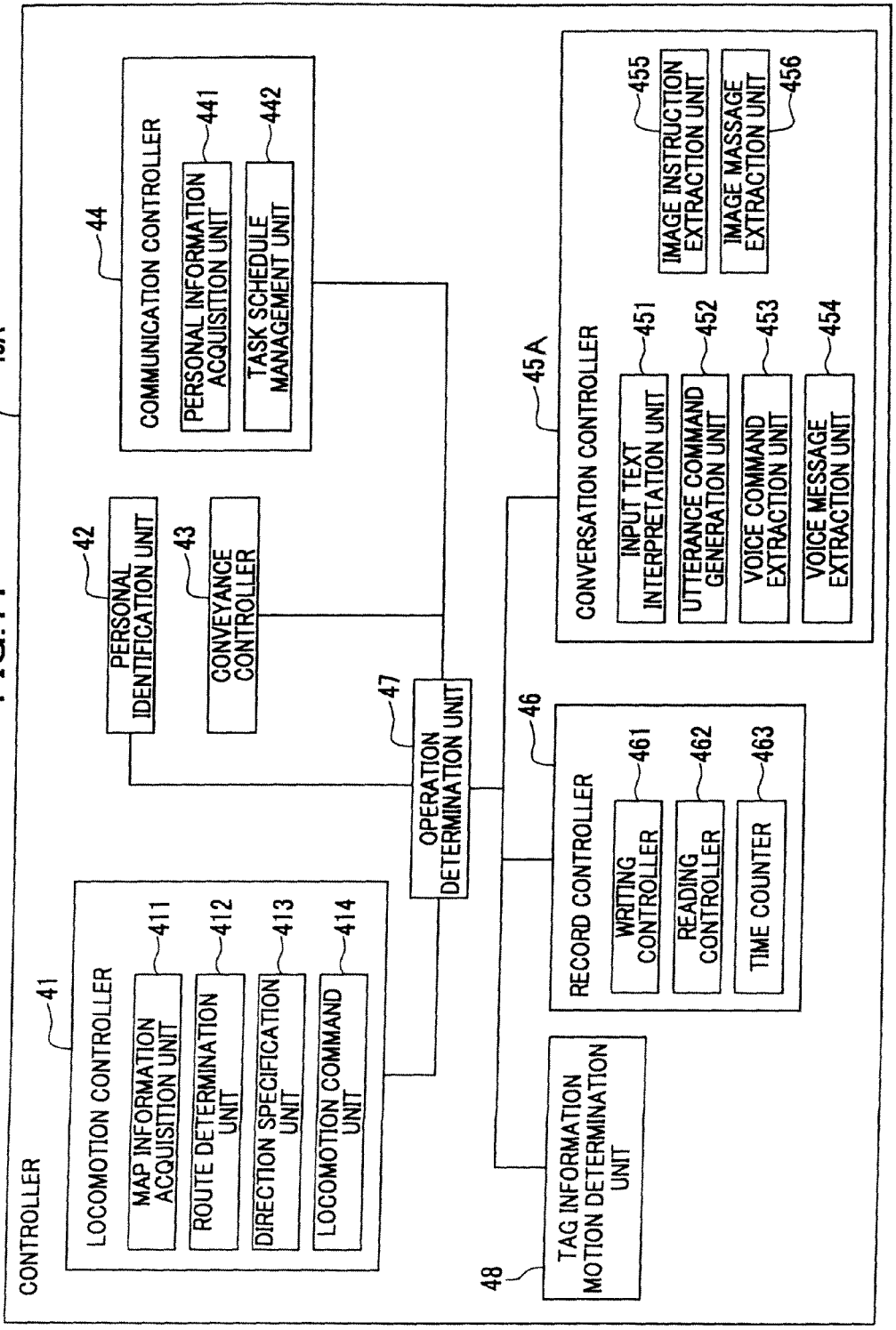
FIG. 11 is a block diagram showing an other configuration of the controller of a robot of FIG. 1.

The controller having this means is shown in FIG. 11. The controller 40A shown in FIG. 11 has the same configuration as the controller 40 shown in FIG. 4 except that the controller 40A includes a conversation controller 45A and a tag information motion determination unit 48. Therefore, the components of the controller 40A, which are the same as the components of the controller 40, are indicated using the same symbols, and the explanation of such components is omitted here.

As shown in FIG. 11, the conversation controller 45A further includes an image instruction extraction unit 455 and an image message extraction unit 456.

Also, unique image information, which indicates a gesture or sign language related with the command or the message, is stored for each command or message in the recording unit 30 (see FIG. 2).

This unique image information includes command-related unique image information and message-related unique image information. Here, command-related unique image information is associated with the command, and message-related unique image information is associated with the predetermined message keyword.

Here, unique image information may be stored in the recording unit 200 of the management computer 3 beforehand. In this case, the robot R can obtain unique image information from the management computer 3, as appropriate.

Here, the detail of the technique which enables the robot R to recognize gesture is for example disclosed in Japanese unexamined patent publication No. 2004-302992, and the technique disclosed therein can be adoptable in the present invention.

The image instruction extraction unit 455 extracts an command associated with command-related unique image information by the pattern matching between the command-related unique image information stored in the recording unit 30 and image information extracted by the image processor 10.

To be more precise, the image instruction extraction unit 455 extracts "hakonde" (English meaning: carry) which is a command associated with command-related unique image information, when the image instruction extraction unit 455 judges that the image information extracted by the image processor 10 agrees with command-related unique image information associated with the instruction of "## wo hakonde" (English meaning: please carry ## (substantive)).

Then, the operation determination unit 47 recognizes the input of the instruction which commands the conveyance (delivery) of the object based on the extracted "hakonde", and the operation determination unit 47 generates the command by which the robot R takes the action in compliance with the command.

Also, the image instruction extraction unit 455 notifies the image message extraction unit 456 that "tutaete" (English meaning: send a message) is extracted, when the "tutaete", which is a command associated with the command-related unique image information, is extracted.

When "tutaete" which is an instruction associated with the command-related unique image information is extracted by the image instruction extraction unit 455, the image message extraction unit 456 extracts the message (text data) associated with the message-related unique image information by the pattern matching between message-related unique image information stored in the recording unit 30 and image information extracted just before command-related unique image information.

To be more precise, the image message extraction unit 456 extracts "thank you" (text data) which is a message associated with the message-related unique image information, when it is judged that image information extracted just before the command-related unique image information from among image information extracted by the image processor 10 agrees with message-related unique image information indicating "thank you".

When the message is extracted, the operation determination unit 47 outputs the signal, which indicates the extraction of the message, to the record controller 46, and the message "thank you" (text data) is then stored on the tag T.

The tag information motion determination unit 48 determines the motion based on at least one of the tag ID (personal information), which is obtained from the detection tag D by the target detection unit 70 (see FIG. 2), and information (message), which is written by the writer 81.

For example, by providing beforehand a table in which the tag ID and an utterance command are correlated each other, the tag information motion determination unit 48 changes the command for the conversation controller 45 based on the table, when the tag ID is obtained. Thereby, the robot R can change the contents of the utterance for each client who has ordered the conveyance.

Also, by providing beforehand a table, in which a message and a command of the head R1 and arm R2 are correlated each other, the tag information motion determination unit 48 changes the command for the autonomous travel controller 50 based on the table, when the message is obtained.

Thereby, the robot R can change the motion of the head R1 and arm R2 in accordance with the message. To be more precise, the robot R can make a bow together with the utterance of "Thank you", under the control of the tag information motion determination unit 48. Additionally, the robot R can raise the one of arms by actuating the arm R2 together with the utterance of "Thank you" to the recipient of the object.

Here, since the motion (processing) with regard to the recording of message and the conveyance of the object is the same as the motion (processing) explained in the above described embodiment, the explanation thereof is omitted.

The controller 40A shown in FIG. 11 is a best mode and includes a set of the image instruction extraction unit 455 and image message extraction unit 456, and the tag information motion determination unit 48. But the controller 40A may include only one of these components.

In the above described embodiment, the explanation was made on assumption that the tag ID is stored on the detection tag D. But, the information with regard to the person with the detection tag D may be stored on the tag D.

By adopting this configuration, since the writer 81 can record the name of the client on the tag T in addition to the message, the recipient can easily recognize the person who sent the message. In this case, additionally, the acquisition of the name as personal information from the management computer 3 is not required.

In the above described embodiment, the explanations have been given on assumption that the robot R requests a message after the robot R receives and grabs the object X from the client, and that the robot R sends the message after the robot passes the object to the recipient.

In the present invention, however, the timing of the utterance of the robot, i.e. the timing of the request and transfer of a message, is not limited to the above described embodiment.

For example, as shown in FIG. 6, the robot R may receive and grab the object X from the client after the robot receives a message, and the robot may pass the object to the recipient after the robot R sends the message.

In the above described embodiment, the explanation was given without distinguishing the robot, which records a message on the tag T, and the robot, which reads a message from the tag T. In the present invention, the robot, which records a message on the tag T, may be different from the robot, which reads a message from the tag T.

In this case, the robot, which records a message on the tag T, may record the contents (name of recipient etc.) of the task on the tag T, in addition to a message (the message including a time and current position of the robot R) etc.

Thus, the robot R different from the robot R which has recorded a message reads the contents of the task recorded on the tag T and performs the task instead of the robot R which has recorded a message.

In the message recording system, therefore, when the robot R which was requested to perform an interrupt task, cannot accept the interrupt task, the other robot can accept the interrupt task instead of the robot R which was requested to perform an interrupt task.

In the above described embodiment, the explanation was given on the assumption that the message recorded on the tag T is delivered from one person (client) to the other person (recipient) together with the conveyance task of the robot R. The present invention is not limited to the above described embodiment. That is, the message maybe returned to the client. Here, for example, it is assumed that the client requests the task which commands the robot R to put books (object) in order (to arrange books on a bookshelf). In this case, the client utters "kono honn wo 50 pe-ji made yonda, hondana ni hakonde" (English meaning: I read this book up to page 50, please carry this book to a bookshelf). Then, the robot R records "kono honn wo 50 pe-ji made yonda" (English meaning: I read this book up to page 50) on the tag T, and transfers the book (object) to the bookshelf.

After intervals, the client requests the robot to perform the task, which commands the robot R to obtains the book (object) from the bookshelf and carry the book to the client.

In this case, the robot R outputs the message on the tag T, when the robot R detects the client. To be more precise, for example, the robot R outputs the voice message "Mr. X, I have received this book at 1:00 P.M. on 12th. You have already read this book up to page 50."

In this case, since the person (client) can bring back memory at the time of when the client requested the robot R to arrange books on a bookshelf, the assist of memorization of the client can be performed.

In the above described embodiment, the target detection unit 70 and the record processor 80 are separately provided. But, the target detection unit 70 may have the function of the record processor 80, i.e. may have a function to record/read data etc. on/from a tag T.

In the above described embodiment, additionally, the interface apparatus of the present invention is provided on the autonomous mobile robot. But, the present invention is not limited to this, the interface apparatus of the present invention may be provided on the apparatus, which includes each part (for example, a personal computer, camera C, microphone MC, speaker S, etc.) except the autonomous travel controller 50 (the autonomous move control part 50, the head R1 and the arm R2, and leg R3) of the robot R shown in FIG. 2.

In the above described embodiment, furthermore, the explanation was given on the condition that the writer 81 of the robot R records the message only on the tag T. But, the writer may record at least message on the tag T and the detection tag D.

The writer 81, additionally, may record the time and the current position on the detection tag D together with the message. In this case, for example, the robot R can record the time and the current position on the detection tag D attached to the client together with the message "thank you", when the robot R receives the object from the client.

When the robot R, which has finished the conveyance task, detects again the client within a predetermined time (for example 1 week) from the finish of the conveyance task, the robot R may recognize that the detected person is the person who requested the conveyance task. Then, the robot obtains the information from the detected tag D and can output voice message such as "Mr. X, I have delivered your message "thank you" to Ms. H2 at 15 p.m. on 12th". Thereby, the client (Mr. X) can bring back memory at the time of when the client requested the robot R to carry the message to Mr. H2.

What is claimed is:

1. A mobile robot, comprising:
   an interface apparatus recording a message on a wireless tag, the interface apparatus comprising
      a voice recognition unit recognizing a voice input by a voice input unit which inputs a voice of a person,
      a message extraction unit extracting the message from the voice recognized by the voice recognition unit,
      a writer writing the message extracted by the message extraction unit on an object tag, which is a wireless tag for an object and is provided on the object,
      an image processing unit extracting image information of a person from an acquired image which is obtained by an image pickup of the person by an image pickup unit,
      an image message extraction unit extracting a message associated with unique image information, based on unique image information and image information extracted by the image processing unit,
      a reading unit obtaining information from the object tag or a person tag which is a wireless tag for a person and stores personal information of the person, and
      a voice synthesizer synthesizing voice information which is associated with the information recorded on the object tag or the person tag as an output voice based on information obtained by the reading unit,
      wherein unique image information is a gesture or sign language associated with the message, and
      wherein the writer writes the message extracted by the image message extraction unit on the object tag;
   a current position information acquisition unit acquiring position information which indicates a current position of the mobile robot;
   a locomotion unit for traveling the robot to a destination; and
   an autonomous travel controller actuating the locomotion unit based on a command which indicates the destination and map information indicating a map within a predetermined moving range.

2. A mobile robot according to claim 1, further comprising:
   a time clock obtaining a time,
   wherein the writer writes the time obtained by the time clock together with the message on the object tag.

3. A mobile robot according to claim 1, further comprising:
   an operation determination unit determining an operation to be performed by the mobile robot from among operations at least including a delivery of the object and a utterance of a predetermined voice in accordance with an input of a predetermined command,
   wherein the motion determination unit determines the operation based on at least one of personal information, which is obtained from the person tag by the reading unit of the interface apparatus, and information written by the writer.

4. A mobile robot according to claim 1, further comprising:
   an operation determination unit determining an operation to be performed by the mobile robot from among operations at least including a delivery of the object and a utterance of a predetermined voice in accordance with an input of a predetermined command,
   wherein the motion determination unit determines the operation based on at least one of personal information, which is obtained from the person tag by the reading unit of the interface apparatus, and information written by the writer.

5. A mobile robot according to claim 1, wherein the autonomous travel controller actuates the locomotion unit to move the robot to the destination where an operation determined by a motion determination unit is performed.

* * * * *